(12) United States Patent
Phelps et al.

(10) Patent No.: US 7,003,359 B2
(45) Date of Patent: Feb. 21, 2006

(54) MULTIPLE PROCESS PLANT PRODUCT LINES FROM A COMMON SET OF ENGINEERED COMPONENTS

(75) Inventors: David Cyril Phelps, Banstead (GB); Michael Kenneth Wolk, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 816 days.

(21) Appl. No.: 09/932,545

(22) Filed: Aug. 17, 2001

(65) Prior Publication Data

US 2003/0109948 A1 Jun. 12, 2003

(51) Int. Cl.
*G06F 19/00* (2006.01)
(52) U.S. Cl. .................................. 700/97; 700/105
(58) Field of Classification Search ................ 700/97, 700/105–107; 705/7, 8
See application file for complete search history.

(56) References Cited

U.S. PATENT DOCUMENTS

| | | | | |
|---|---|---|---|---|
| 4,433,990 | A * | 2/1984 | Olszewski | 62/648 |
| 4,862,345 | A * | 8/1989 | Lekron | 700/83 |
| 6,004,021 | A | 12/1999 | Rothbarth | 364/578 |
| 6,049,659 | A | 4/2000 | Matsumoto et al. | 395/500.02 |
| 6,108,662 | A | 8/2000 | Hoskins et al. | 707/102 |
| 6,195,593 | B1 | 2/2001 | Nguyen | 700/97 |
| 6,274,096 | B1 * | 8/2001 | Thiebaut et al. | 422/148 |
| 2002/0016725 | A1 * | 2/2002 | Eichstaedt et al. | 705/7 |
| 2002/0040257 | A1 * | 4/2002 | Baumgartner et al. | 700/105 |

FOREIGN PATENT DOCUMENTS

| | | |
|---|---|---|
| EP | 0508386 | 10/1992 |
| EP | 0991000 | 4/2000 |
| EP | 1052559 | 11/2000 |
| GB | 2197910 | 6/1988 |
| GB | 2325324 | 11/1998 |

OTHER PUBLICATIONS

Lapp, C.W. et al, "Modular Design and Construction Techniques for Nuclear Power Plants", *Nuclear Engineering and Design* 172 (1997) 327-349.

Howe, A.S. et al, "Kit-of-Parts: A Review of Object-Oriented Construction Techniques", *Publication of Universidad Carlos III de Madrid, Spain*, 1999.

Lien, Kristian et al, "Future Directions for Cape Research Perceptions of Industrial Needs and Opportunities":, *Computers chem. Engng* vol. 20, Suppl., pp. S1551-S1557.

Barbosa-Povoa et al, "Design of Flexible Multipurpose Batch Plants", *Acta Chimica Slovenica* 42/Jan. 1995, pp. 75-80.

Schmidt-Traub, H. et al., "Communications An Approach to Plant Layout Optimization", *Chem. Eng. Technol.* 22 (1999) 2.

(Continued)

*Primary Examiner*—Albert W. Paladini
*Assistant Examiner*—Ryan A. Jarrett
(74) *Attorney, Agent, or Firm*—Robert J. Wolff

(57) ABSTRACT

A method for process plant design which comprises (a) preparing a detailed design for a process plant in a product line including a detailed design of at least one engineered component and (b) preparing a detailed design for another process plant in a different product line wherein the detailed design of the at least one engineered component of (a) is reused in (b).

27 Claims, 14 Drawing Sheets

OTHER PUBLICATIONS

Hiltunen, J., et al, "Module Based Design and Dimensioning System for Industrial Processes", *Computer-Oriented Process Engineering*, edited by L. Puigjaner and A. Espuna, Elsevier Science Publishers B.V., Amsterdam, 1991—Printed in the Netherlands.

Kumar, B. et al, "INDEX: An INDustrial Building Design Expert", *Civ. Engng Syst*. 1988, vol. 5, Jun.

Batres, Rafael et al, "An Agent-based Environment for Operational Design", *Computers chem . . . Engng*, vol. 21, Suppl., pp. S71-S76, 1997.

Mesa, A.A. et al, "Design of the Maximum Energy Efficiency Desalination Plant" (PAME) *Desalination 108* (1996) 111-116.

\* cited by examiner

MULTIPLE PROCESS PLANT PRODUCT LINES FROM A COMMON SET OF ENGINEERED COMPONENTS

BACKGROUND OF THE INVENTION

Suppliers of process plants in the process industries often design and construct plants to the specifications of each buyer on a built-to-order custom basis. This is common practice when the process plants are low-volume, highly-specialized, high-cost products. Such plants are utilized in process industries such as petroleum refining, chemicals, industrial gases, pharmaceuticals, primary metals, and food processing. Design and engineering costs for such plants are significant because much of the design and engineering work is done on a one-off basis and cannot be reused for future plants.

Suppliers of process plants attempt to standardize component selection and design efforts as much as possible in order to offer cost-competitive product lines to potential buyers. Greater standardization of plant components, which brings the benefits of mass production to the supplier, can be contrary to the buyer's desire for customization and maximum flexibility. Because the cost of engineering design is a major component of the capital cost of a large process plant, the supplier has a significant incentive to standardize engineering design work in order to offer a cost-competitive plant which performs to the buyer's specifications. The challenge to the process plant supplier is to balance a maximum selection of process plants in each product line with a minimum number of standard components used in process plant design, while at the same time ensuring acceptable choices and flexibility for the buyer. When this is achieved, improved competitive position and profitability will be realized by the supplier, while maximum value will be realized by the buyer.

The example embodiments of the present invention address the need for an engineering design approach to provide process plant product lines which satisfy buyers' requirements while minimizing engineering design costs by maximizing the use of repeatable engineered components in each plant design.

BRIEF SUMMARY OF THE INVENTION

The invention relates to a method for process plant design which comprises (a) preparing a detailed design for a process plant in a product line including a detailed design of at least one engineered component, and (b) preparing a detailed design for another process plant in a different product line wherein the detailed design of the at least one engineered component of (a) is reused in (b).

In an embodiment of the invention, the method may include:

(a) defining a plurality of process plant product lines;

(b) preparing a general process design for each process plant product line;

(c) dividing each of the general process designs of (b) into a plurality of engineered components;

(d) determining from the plurality of engineered components of (c) a minimum number of repeatable engineered components and the process attributes thereof which are required for future general process designs;

(e) preparing a detailed design of a process plant in a process plant product line, wherein the detailed design includes (e1) selecting specific repeatable engineered components and the process attributes thereof from the minimum number of repeatable engineered components determined in (d) and (e2) preparing a detailed design for one or more of the repeatable engineered components selected in (e1); and (f) preparing a detailed design of a process plant in another process plant product line, wherein (f1) the detailed design includes selecting specific engineered components and the process attributes thereof from the minimum number of repeatable engineered components determined in (d);

(f2) at least one of the repeatable engineered components selected in (f1) is identical to one of the repeatable engineered components of (e2) for which a detailed design has been prepared; and (f3) the detailed design of the repeatable engineered component of (e2) is reused in the detailed design of the process plant of (f).

This embodiment also may include, as part of (d), modifying the general process designs for one or more of the process plants to optimize the combination of general process designs and the minimum number of repeatable engineered components and the process attributes thereof. Further, the embodiment may include preparing additional detailed designs of process plants in the process plant product lines wherein each additional detailed process plant design utilizes at least one previous detailed design of a repeatable engineered component. A detailed design may be prepared for at least one additional repeatable engineered component.

The method described above may further include storing design information in electronic format from previous detailed designs of repeatable engineered components in a computer-based document and data management system for future use in additional detailed designs of process plants in the process plant product lines.

The future general process design of each process plant may allow acceptable projections of plant capital cost and operating efficiency. The process plant product lines may comprise cryogenic air separation plants, hydrogen production plants, or gas separation pressure swing adsorption plants. The pressure swing adsorption plants may be designed for the separation of air.

The repeatable engineered components may include engineered components selected from the group consisting of feed air cleanup systems, main heat exchangers, reboilers, distillation column sections, cold enclosures, main air compression systems, air booster compressors, gas expanders, recycle compressors, process control systems, warm piping, cold piping, cryogenic liquid pumps, and product gas compressors. Each distillation column section may be defined by the column diameter and the height of vapor-liquid mass transfer devices. Each main air compression system may be defined by maximum air flow rate and discharge pressure. Each gas expander may be defined gas flow rate and pressure ratio.

The process plant product line may include air separation plants which produce one or more products selected from the group consisting of oxygen gas containing 95–99 vol % oxygen, oxygen gas containing up to 99.8 vol % oxygen, liquid oxygen, nitrogen gas containing between about 0.1 to 1 parts per million by volume non-nitrogen components, nitrogen gas containing up to about 0.5 parts per billion by volume non-nitrogen components, and liquid nitrogen.

The invention also relates to a method for process plant design which comprises:
(a) defining a plurality of process plant product lines;
(b) defining a minimum number of repeatable engineered components and the process attributes thereof such that specific repeatable engineered components can be selected therefrom and combined in a general process design of each process plant product line;
(c) preparing a detailed design of a process plant in a process plant product line which includes selecting specific repeatable engineered components from the minimum number of repeatable engineered components defined in (b), wherein the detailed design of the process plant includes preparing a detailed design of at least one of the selected repeatable engineered components; and
(d) preparing detailed designs of one or more additional process plants in different process plant product lines which includes selecting specific repeatable engineered components from the minimum number of repeatable engineered components defined in (b), wherein at least one of the specific repeatable engineered components selected in (d) is identical to the selected repeatable engineered subsystem of (c) for which the detailed design was prepared, and preparing additional detailed designs of repeatable engineered subsystems required for the detailed designs of additional process plants in (d), wherein at least one of the process plant product lines in (d) is different than the process plant product line in (c); and
(e) storing design information from the detailed designs of repeatable engineered components in (c) and (d) in a design database for future use in additional detailed designs of process plants in the process plant product lines.

The future general process design of each process plant preferably allows acceptable projections of plant capital cost and operating efficiency.

The method may further comprise preparing a general process design of a process plant suitable for a cost proposal, wherein the general process design comprises:
(1) determining the process plant requirements of a potential buyer;
(2) choosing from the process plant product line a selected process plant which satisfies the requirements of the potential buyer; and
(3) preparing a general process design of the selected process plant which includes utilizing repeatable engineered components selected from the minimum number of repeatable engineered components defined in (b) above.

This method may further comprise utilizing the general process design of the selected process plant to prepare a cost proposal for the potential buyer. The method may further comprise preparing a detailed design of the selected process plant which includes utilizing the design information of (e) above for the repeatable engineered components selected in (3) above.

The invention also relates to a method for process plant design which comprises:
(a) defining a plurality of process plant product lines, generating a first set of electronic documents containing the definitions of the process plant product lines, and storing the first set of electronic documents in a computer-based document and data management system;
(b) preparing a general process design for each process plant product line, generating a second set of electronic documents containing process design information for each process plant, and storing the second set of electronic documents in the computer-based document and data management system;
(c) dividing each of the general process designs of (b) into a plurality of engineered components;
(d) determining from the plurality of engineered components of (c) a minimum number of repeatable engineered components and the process attributes thereof which are required for future general process designs, generating a third set of electronic documents which contain information defining the minimum number of repeatable engineered components and the process attributes thereof, and storing the third set of electronic documents in the computer-based document and data management system;
(e) preparing a detailed design of a process plant in a process plant product line, wherein the detailed design includes
 (e1) selecting specific repeatable engineered components and the process attributes thereof from the minimum number of repeatable engineered components determined in (d) and retrieving information in electronic form on the specific repeatable engineered components and the process attributes thereof from the third set of electronic documents in the computer-based document and data management system;
 (e2) preparing a detailed design for one or more of the repeatable engineered components selected in (e1), generating a fourth set of electronic documents containing detailed design information; and storing the fourth set of electronic documents in the computer-based document and data management system;
(f) preparing a detailed design of a process plant in another process plant product line, wherein
 (f1) the detailed design includes selecting specific engineered components and the process attributes thereof from the minimum number of repeatable engineered components determined in (d) and this selected information is retrieved in electronic form from the third set of electronic documents in the computer-based document and data management system;
 (f2) at least one of the repeatable engineered components selected in (f1) is identical to one of the repeatable engineered components of (e2) for which a detailed design has been prepared and stored electronically in the computer-based document and data management system; and
 (f3) the detailed design of the one repeatable engineered component of (e2) is retrieved in electronic form from the fourth set of electronic documents and is reused in the detailed design of the process plant of (f).

The invention may include a method for cryogenic air separation plant design which comprises:
(a) defining a plurality of cryogenic air separation process plant product lines;
(b) preparing a general process design for each cryogenic air separation process plant product line;
(c) dividing each of the general process designs of (b) into a plurality of engineered components;
(d) determining from the plurality of engineered components of (c) a minimum number of repeatable engineered components and the process attributes thereof which are required for future general cryogenic air separation process plant designs;

(e) preparing a detailed design of a process plant in a cryogenic air separation process plant product line, wherein the detailed design includes
   (e1) selecting specific repeatable engineered components and the process attributes thereof from the minimum number of repeatable engineered components determined in (d) and
   (e2) preparing a detailed design for one or more of the repeatable engineered components selected in (e1); and (f) preparing a detailed design of a process plant in another cryogenic air separation process plant product line, wherein
   (f1) the detailed design includes selecting specific engineered components and the process attributes thereof from the minimum number of repeatable engineered components determined in (d);
   (f2) at least one of the repeatable engineered components selected in (f1) is identical to one of the repeatable engineered components of (e2) for which a detailed design has been prepared; and
   (f3) the detailed design of the repeatable engineered component of (e2) is reused in the detailed design of the process plant of (f).

The repeatable engineered components may comprise engineered components selected from the group consisting of feed air cleanup systems, main heat exchangers, reboilers, distillation column sections, cold enclosures, main air compression systems, air booster compressors, gas expanders, recycle compressors, process control systems, warm piping, cold piping, cryogenic liquid pumps, and product gas compressors. Each distillation column section may be defined by the column diameter and the height of vapor-liquid mass transfer devices. Each main air compression system may be defined by maximum air flow rate and discharge pressure. Each gas expander may be defined gas flow rate and pressure ratio.

The process plant product line may include air separation plants which produce one or more products selected from the group consisting of oxygen gas containing 95–99 vol % oxygen, oxygen gas containing up to 99.8 vol % oxygen, liquid oxygen, nitrogen gas containing between about 0.1 to 1 parts per million by volume non-nitrogen components, nitrogen gas containing up to about 0.5 parts per billion by volume non-nitrogen components, and liquid nitrogen.

In another aspect, the invention may include a system for process plant design which comprises:
(a) a database storing a detailed design of a first process plant in a first product line including a detailed design of at least one engineered component; and
(b) at least one workstation in communication with the database, wherein the at least one workstation is configured to retrieve the detailed design of the at least one engineered component for a user preparing a detailed design of second process plant in a second product line different from the first product line using the retrieved detailed design of the at least one engineered component using the workstation.

The database may be stored at the workstation. The system may further comprise a home server and a database server in communication with the home server, wherein the database resides on the database server. The system also may include a satellite server in communication with the home server and the database server, wherein another workstation is connected to the satellite server.

The invention also relates to a method for cryogenic air separation plant design which comprises:
(a) preparing a detailed design for a cryogenic air separation plant in a first product line, wherein the detailed design includes a detailed design of an engineered component, and wherein the engineered component includes at least one of a feed air cleanup system, a main heat exchanger, a reboiler, a distillation column section, a cold enclosure, a main air compression system, an air booster compressor, a gas expander, a recycle compressor, a process control system, a warm piping system, a cold piping system, a cryogenic liquid pump, and a product gas compressor; and
(b) preparing a detailed design for another cryogenic air separation plant in a second product line different from the first product line using the detailed design of the engineered component.

DETAILED DESCRIPTION

Figure 1:
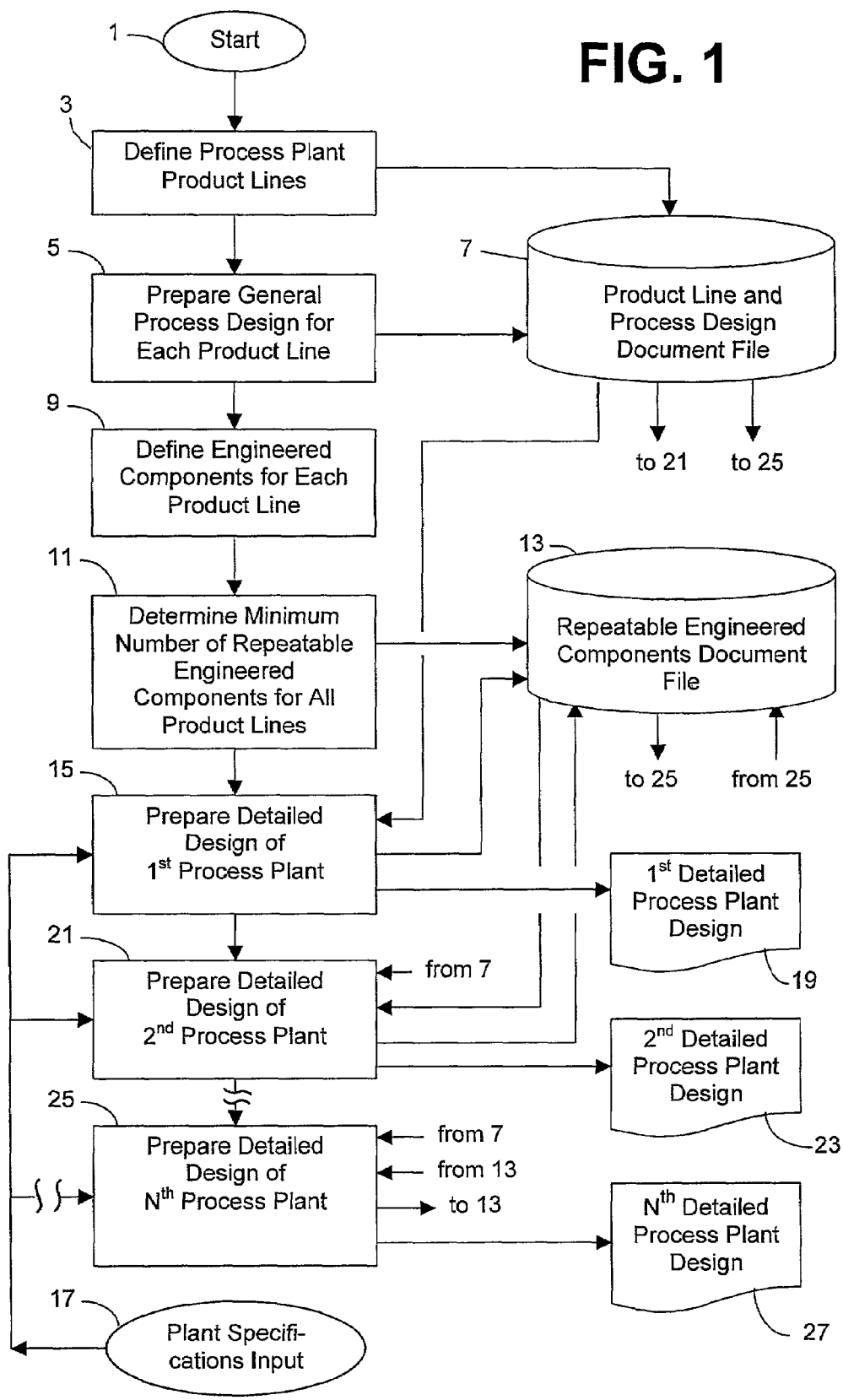
FIG. 1 is a flowchart illustrating an exemplary design method according to the present invention.

The present invention relates to a method and strategy to provide multiple process plant product lines from a common set of engineered components. In the example embodiment, the engineered components may include engineered systems, engineered subsystems, and equipment. The example embodiment provides the framework for the development, design, manufacture, supply, and product management of process plants which achieves costs not previously attainable with such low-volume, high-variability, high-cost products. Detailed designs of engineered components, after initial completion, may be reused across different product lines as well as within the same product lines. In the following, a method for providing cryogenic air separation process plants is presented for illustrative purposes.

The production of industrial gases such as oxygen, nitrogen, argon, hydrogen, and synthesis gas requires highly-specialized, capital-intensive process plants. The industrial gas industry is similar to other process industries such as petroleum refining, chemicals, pharmaceuticals, primary metals, and food processing in that the process plants utilized in these industries typically are low-volume, highly-specialized, high-cost products provided by selected suppliers.

The cryogenic separation of air to provide oxygen and nitrogen products at various purities and pressures is a well-known technology. Traditionally, the suppliers of medium-sized cryogenic air separation plants in the range of 40 to 500 metric tons/day (MT/D) have tended to design plants on a one-off, design-to-order basis. Previous designs have been used when possible as templates or guides to reduce the amount of engineering design effort required for plants within a product line. As competition in the industry has increased, providers of air separation plants have moved towards standardization in which product lines have been developed wherein each product line offers a range of sizes for a given plant design. Typically, limited options have been offered to the buyer. This approach has been relatively successful for smaller plants within product lines when there is a reasonable demand for particular plant sizes and features.

Products and product strategies have been subjected to extensive value engineering in the industry to achieve lowest cost and maximum value for the buyer. Aside from significant technology breakthroughs, there are few techniques which air separation plant providers can use to reduce capital costs further without substantially sacrificing performance and operating costs. Thus there is need for a new approach to the supply of cryogenic plants in order to achieve significantly lower capital costs.

The cryogenic separation of air is a well-known and highly-developed technology particularly well-suited to higher production rates and higher product purities than other known air separation methods. A wide range of cryogenic air separation process cycles has been developed in the industry over the years. Sufficient flexibility can be incorporated in the designs of plants in individual product lines to enable the offering of a wide range of standard options to the buyer in order to match the customer's requirements. This is known as "mass customization", which attempts to balance standardization against design-to-order flexibility within an individual product line.

In accordance with an example embodiment of the present invention, a plurality of process plant product lines may be defined. A process plant may include an integrated group of engineering components configured to convert one or more input feed fluids into one or more product fluids of predefined properties.

A general process design then may be prepared for each process plant product line. In accordance with the example embodiment, a product line or a process plant product line may include a set of process plants wherein the process plants are of similar general process design that may differ in a process parameter such as flow capacity. Plants in different product lines may utilize different general process designs. A general process design may set forth key process parameters for a process plant product line such as capacity, product purity, plant configuration (e.g., the general flow sheet), and related information.

The general process designs may be divided into a number of engineered components. An engineered component may include, for example, engineered systems, engineered subsystems, and pieces of equipment. An engineered system may include a complete assembly of equipment which performs a specific process function, e.g., a main air compression system. An engineering subsystem may include specific hardware which is part of an engineered system, for example, the process piping and instrumentation associated with a main air compression system. A piece of equipment may include a specific machine or fabricated item which performs a specific, individual function, for example, a compressor used in a main air compression system.

From the engineered components, a minimum number of repeatable engineered components and the process attributes thereof which are required for future general process designs may be determined. A repeatable engineered component may include, for example, an engineered component which has been designed in detail for use in a first process plant, wherein the design can be reused with minimal alteration in different process plants. The different process plants can be in the same product line as the first process plant, or in different product lines than the first process plant. Process attributes may include, for example, ranges of operating characteristics such as compressor suction and discharge pressures, volumetric throughput, cooling water requirements, specific power, and other appropriate characteristics.

According to the example embodiment, a detailed design of a process plant in a process plant product line can be prepared. The detailed design of the process plant may include, for example, selecting specific repeatable engineered components and the process attributes thereof from the minimum number of repeatable engineered components, and preparing a detailed design for one or more of the repeatable engineered components selected. A detailed process design may include a general process design for a process plant which is further developed wherein engineered systems, engineered subsystems, and pieces of equipment are fully specified in terms of functionality. A detailed design may include a detailed process design for a process plant which is further developed wherein each engineered system, engineered subsystem, and piece of equipment is completely specified in sufficient detail to allow procurement and manufacture.

A detailed design of a process plant in another process plant product line then may be designed. The detailed design may include the selection of specific engineered components and the process attributes thereof from the minimum number repeatable components determined. At least one of the repeatable engineered components selected may be identical to one of the repeatable engineered components selected in connection with the detailed design of the process plant in the first process plant product line. According to the example embodiment, the detailed design of the repeatable engineered component prepared in connection with the process plant in the first process plant product line may be reused in the detailed design of the process plant in the second process plant product line.

The following description applies the example embodiment of the invention to the design of cryogenic air separation plants for the production of oxygen and nitrogen, both gaseous and liquid, at various purities and pressures.

In the example embodiment, information developed in the project steps is generated in electronic form by computer-based design tools. This information includes, for example, process flow diagrams, piping and instrumentation diagrams, data spreadsheets, vendor-provided documents, cost analyses, and engineering scope reports. The information in electronic form may be manipulated for input, storage, and retrieval by means of a computer-based document and data management system. This system may be the sole repository for all product and design information, and may be accessible for use by different design personnel in different locations. Central storage of all design information in electronic form maintains product line integrity and allows efficient communication among design personnel.

The project steps summarized above are described in detail below and are depicted schematically in the flowchart of FIG. 1, which illustrates the order of the steps and the manipulation of the electronic design information generated therein. FIG. 2 is an exemplary electronic document and data management system which may be used for the manipulation, storage, and retrieval of the electronic design information generated by the project steps of FIG. 1.

The system of FIG. 2 comprises home server 201, satellite server 203, and database server 205. Home server 201 may include electronic data management system 207, electronic data management software 209, and data file 211. Satellite server 203 includes electronic data management system 213, electronic data management software 215, and data file 217. Database 206 resides on database server 205 and may utilize, for example, software such as Microsoft SQL 7 SP1. Home server 201 and satellite server 203 may be separated by a considerable distance and data may be transferred between these servers by high speed network link 219. Files 217 and 211 may be shared or parallel files which optionally are replicated at regular time intervals, for example, daily. Database server 205 may be connected to home server 201 by local network link 220.

Figure 2:
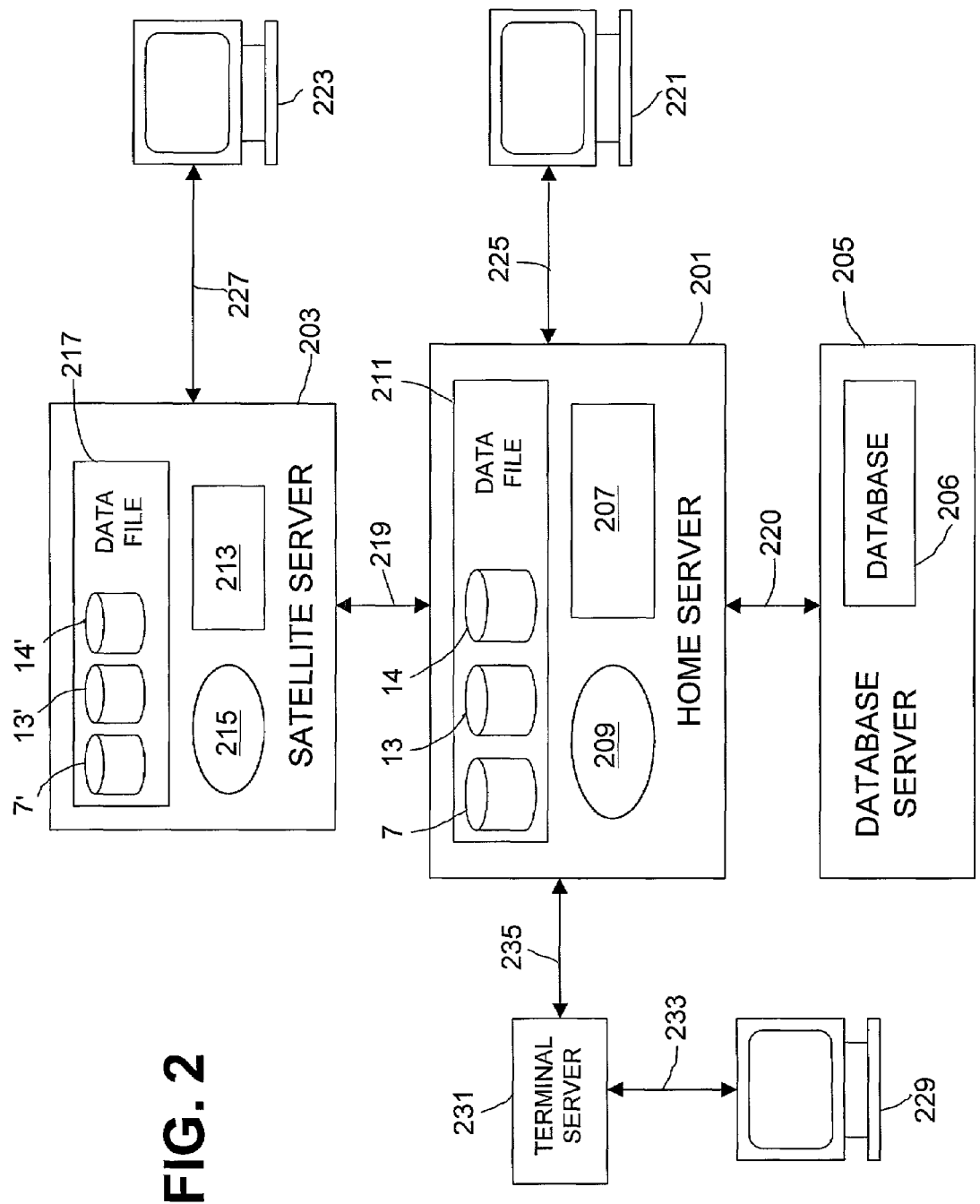
FIG. 2 shows a block diagram of a exemplary computer-based document and data management system.

Users at personal computer or workstation 221 may execute the project steps of FIG. 1 utilizing software which resides on that personal computer or workstation in conjunction with software residing on home server 201. Likewise, users at personal computer or workstation 223 may execute the project steps of FIG. 1 utilizing software which resides on that personal computer or workstation in conjunction with software residing on satellite server 203. Personal computers or workstations 221 and 223 may be connected to home server 201 and satellite server 203 by local network links 225 and 227 respectively. Additional personal computers or workstations (not shown) may be connected to home server 201 and satellite server 203 by local network links (not shown) and may be operated in the same manner as personal computers or workstations 221 and 223.

Optionally, personal computer or workstation 229 may execute project steps of FIG. 1 utilizing software which resides on terminal server 231 in conjunction with software which resides on home server 201. Personal computer or workstation 229 may be connected to terminal server 231 by dialup link 233 and terminal server 231 may be linked to home server by local network link 235. Additional personal computers or workstations (not shown) may be linked with home server 201 in like manner.

Electronic design data and information generated by users executing the project steps of FIG. 1 may be manipulated by electronic data management system 207 and electronic data management software 209, which are resident on home server 201, and also by electronic data management system 213 and electronic data management software 215, which are resident on satellite server 203. The electronic design data and information may be stored in or retrieved from individual data files 7, 13, and 14 located on home server 201 and/or parallel individual data files 7', 13', and 14' located on satellite server 203. Files 7 and 7' may be shared or parallel files which optionally are replicated at regular time intervals, for example, daily. Likewise, files 13 and 13' may be shared or parallel files which optionally are replicated at regular time intervals. In similar fashion, files 14 and 14' may be shared or parallel files which optionally are replicated at regular time intervals.

Referring now to FIG. 1, the method of the present invention begins at project inception 1 and proceeds as described below.

a) Define a Plurality of Process Plant Product Lines

The first step in the example process, step 3 in FIG. 1, is the definition of the generic process plant product lines which cover the market for these plants based on an understanding of buyers' requirements. According to the example embodiment, the generic process plant product lines are shown in Table 1 below.

TABLE 1

| | Generic Product Lines | | | | | | |
|---|---|---|---|---|---|---|---|
| | Gaseous Oxygen | | LOX | Gaseous Nitrogen | | | LIN |
| Product Line Code | Purity, vol % $O_2$ | Pressure, barg | % Make | Product Purity | Pressure | % Make | % Make |
| 0 | 95–97 | 1.1 | 0–3 | | | | |
| 1 | 95–97 | 1.1 | 0–10 | | | | |
| 2 | 95–97 | 1.3 | 0–10 | ppm | ≦5 barg | 0–15 | 0–10* |
| 3 | 95–97 | 1.3 | 0–10 | ppm | LP | 15–50 | 0–10* |
| 4 | up to 99.8 | 1.3 | 0–10 | ppm | ≦5 barg | 0–15 | 0–10* |
| 5 | up to 99.8 | 1.3 | 0–10 | ppm | LP | 15–50 | 0–10* |
| 6 | | | | ppm | 4–11 barg | 100 | 0–10 |
| 7 | | | | 100 ppb | 4–11 barg | 100 | 0–10 |

TABLE 1-continued

Generic Product Lines

| Product Line Code | Gaseous Oxygen | | LOX | Gaseous Nitrogen | | LIN |
| --- | --- | --- | --- | --- | --- | --- |
| | Purity, vol % $O_2$ | Pressure, barg | % Make | Product Purity | Pressure | % Make | % Make |
| 8 | | | | ppb | 4–11 barg | 100 | 0–10 |
| 9 | | 0.4 | 0–1 (UHP) | ppb | 4–11 barg | 100 | 0–10 |

LOX = liquid oxygen
LIN = liquid nitrogen
*Plant will make up to 10% LOX, 10% LIN, or a combined total % make up to 10%
% make is defined as the % of the total plant oxygen make
LOX and LIN make is based on total oxygen make
Gaseous nitrogen make is based on total feed air flow
LP = just above atmospheric pressure
Nitrogen product purity is defined as the total concentration of non-nitrogen contaminants
ppm = typically 1–5 parts per million (volume)
ppb = typically 1–5 parts per billion (volume)
UHP = ultra high purity oxygen containing typically 1–5 ppb non-oxygen contaminants In this example, each of the process plant cases 0 through 9 is considered a single product line, and each of these product lines includes individual plants having selected sizes, products, and production rates. Specific plant production rates or capacities are defined for the each of the product lines. These nominal production ranges or plant sizes in combination with the generic process plant product lines of Table 1 define the main process plant product lines according to the example embodiment. Exemplary nominal plant product flow ranges are summarized in Table 2 below.

TABLE 2

Nominal Plant Production Ranges

| Plant Capacity Code | Main Product Gas | Nominal Production Range, $Nm^3/hr$ |
| --- | --- | --- |
| AO | Oxygen | 670–1500 |
| BO | Oxygen | 1000–2140 |
| CO | Oxygen | 1430–3140 |
| DN | Nitrogen | 1880–3600 |
| EO | Oxygen | 2000–4500 |
| FN | Nitrogen | 2670–5200 |
| GO | Oxygen | 2640–5500 |
| HN | Nitrogen | 3870–7470 |
| JO | Oxygen | 3900–8360 |
| KN | Nitrogen | 4270–8470 |
| LN | Nitrogen | 6930–13470 |

In this example, the complete process plant product line may be defined from the information in Tables 1 and 2, and the main product line matrix may be generated as shown in Table 3 below.

TABLE 3

Main Process Plant Product Line Matrix

| Plant Capacity Code (Table 2) | Product Line Code (Table 1) | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| AO | X | X | X | X | X | X | | | | |
| BO | X | X | X | X | X | X | | | | |
| CO | X | X | X | X | X | X | | | | |
| DN | | | | | | | X | X | X | X |
| EO | X | X | X | X | X | X | | | | |
| FN | | | | | | | X | X | X | X |
| GO | X | X | X | X | X | X | | | | |
| HN | | | | | | | X | X | X | X |
| JO | X | X | X | X | X | X | | | | |
| KN | | | | | | | X | X | X | X |
| LN | | | | | | | X | X | X | X |

In addition to the main process plant product lines summarized above, a supplemental product line may be defined for high pressure oxygen product which is provided by pumped liquid oxygen (LOX) cycles. This exemplary supplemental high pressure oxygen product line may be summarized in the matrix given in Table 4 below.

TABLE 4

High Pressure Oxygen Process Plant Product Line Matrix

| Plant Capacity Code (Table 2) | Product Line Code (Table 1) | | | | |
| --- | --- | --- | --- | --- | --- |
| | 1 | 2 | 3 | 4 | 5 |
| AO | X | X | X | X | X |
| BO | X | X | X | X | X |
| CO | X | X | X | X | X |
| EO | X | X | X | X | X |
| GO | X | X | X | X | X |
| JO | X | X | X | X | X |

In addition to the process plants described above, four additional plants may be defined which are variants of product line codes 0, 2, 3, 4, and 5 of Table 1. In these additional plant options, no liquid is produced, and gaseous nitrogen make can be up to 20% greater than shown in Table 1. These correspond to plants identified by plant capacity codes AO, BO, CO, and EO.

The entire family of example process plants in the product lines may be defined by the indicated combinations of plant capacity and product line codes in Tables 3 and 4 above.

Figure 3:
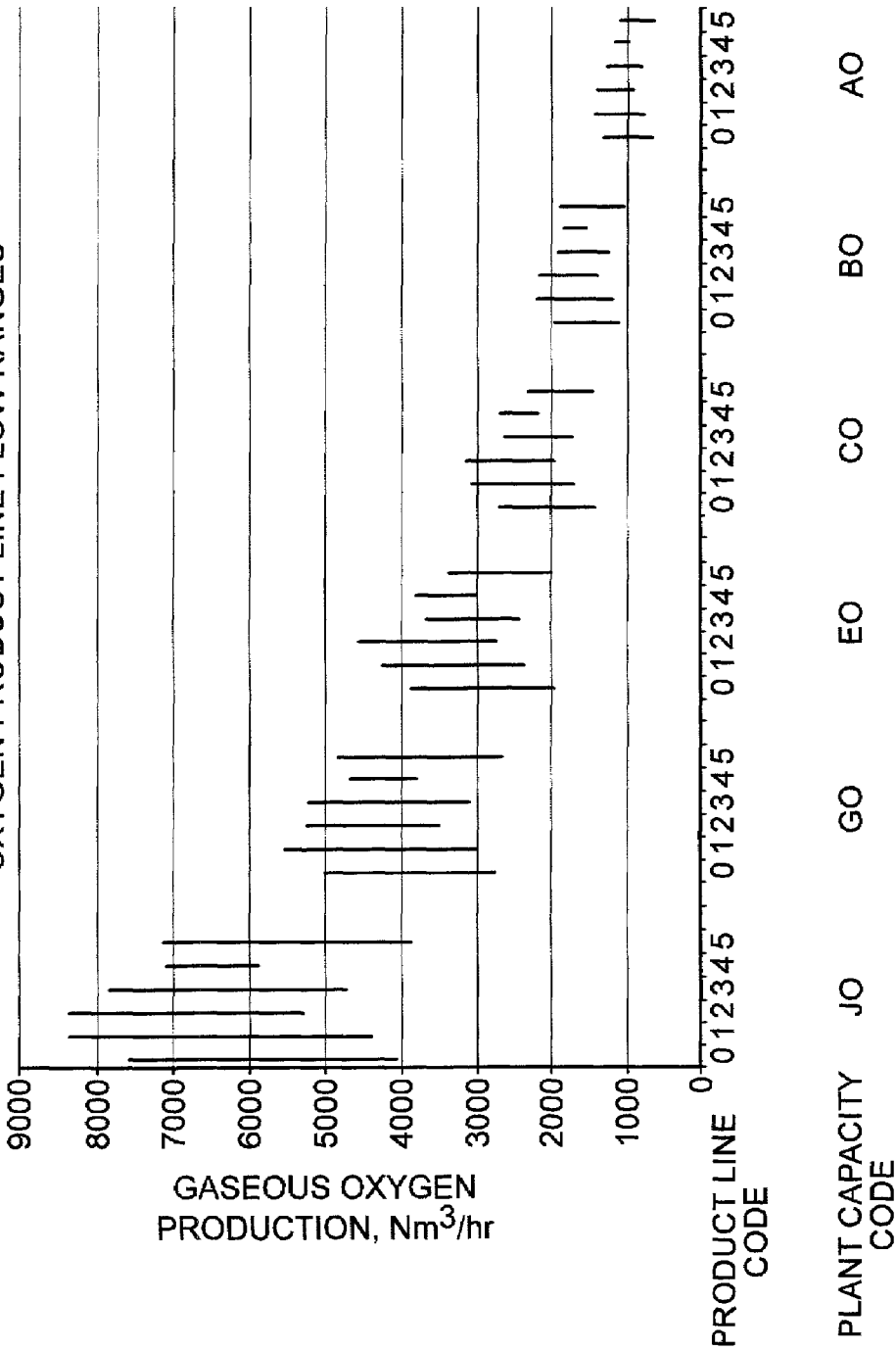
FIG. 3 is a graphic depiction of the ranges of oxygen production capacity for each plant case and nominal plant size for product line codes 0 through 5 of the example embodiment of the present invention.
Figure 4:
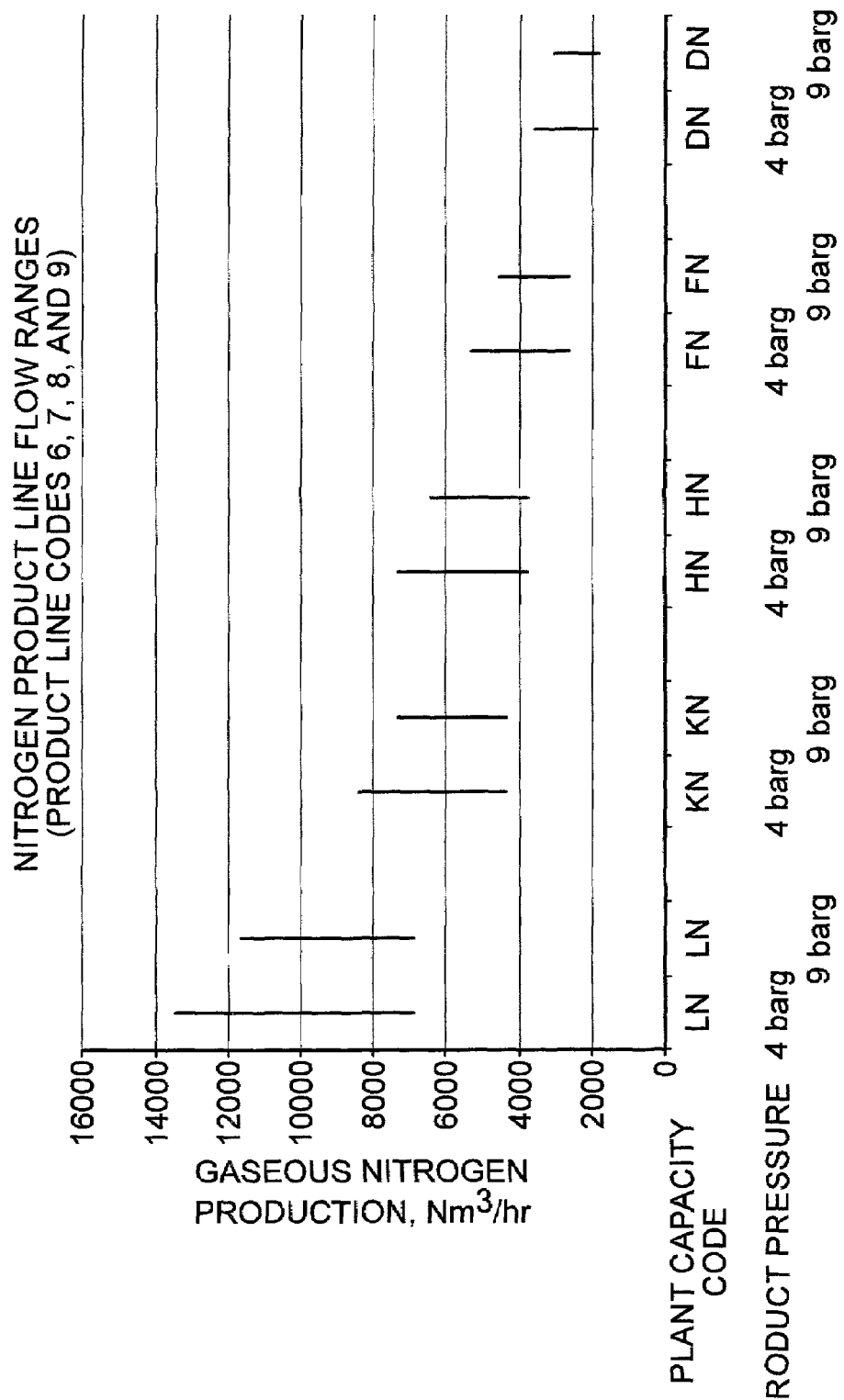
FIG. 4 is a graphic depiction of the ranges of nitrogen production capacity for each product line and nominal plant size for product line codes 6 through 9 of the example embodiment of the present invention.
Figure 5:
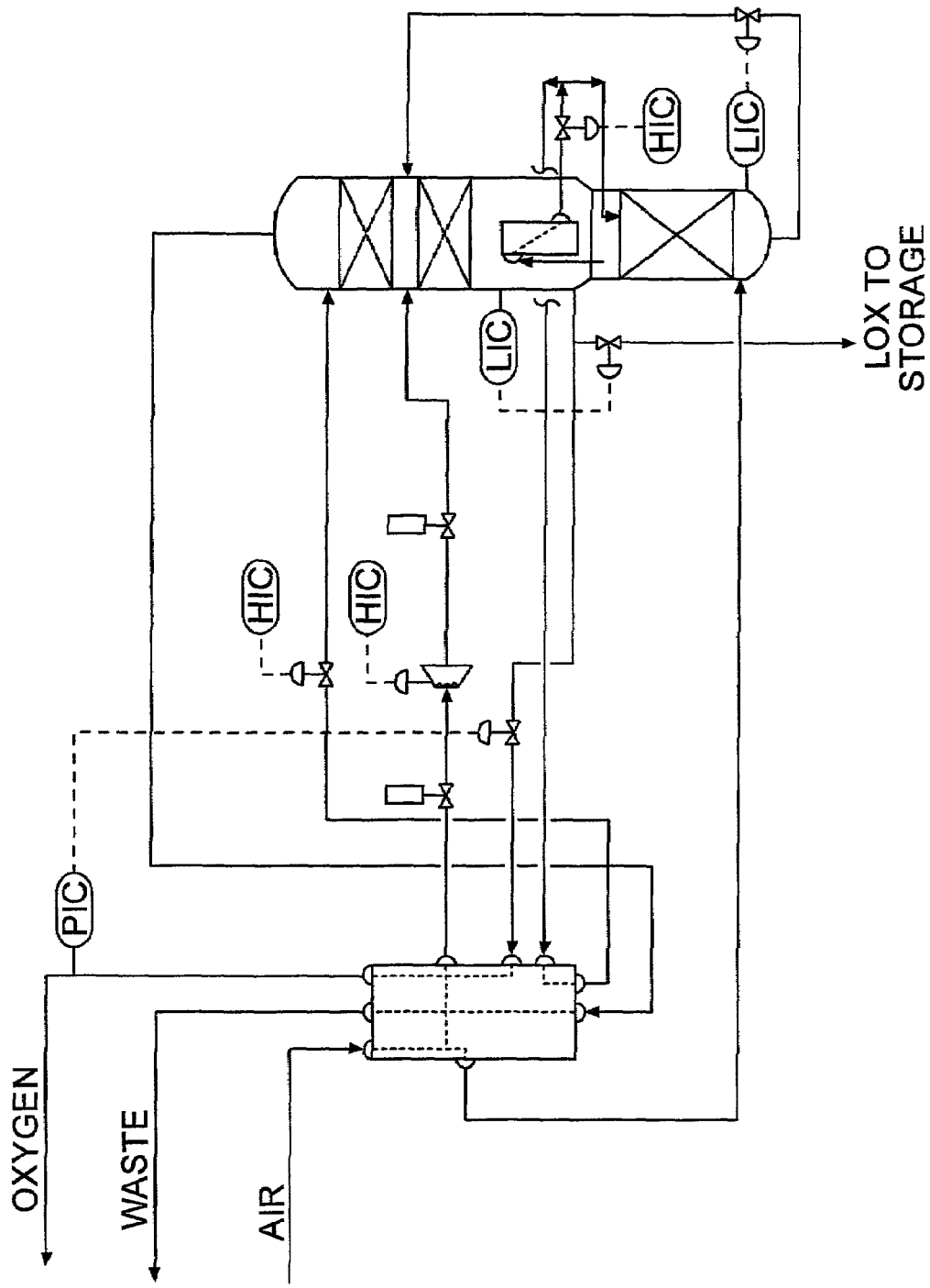
FIG. 5 is a schematic flowsheet for the cryogenic air separation process cycle for product line code 0 according to the example embodiment of the present invention.
Figure 6:
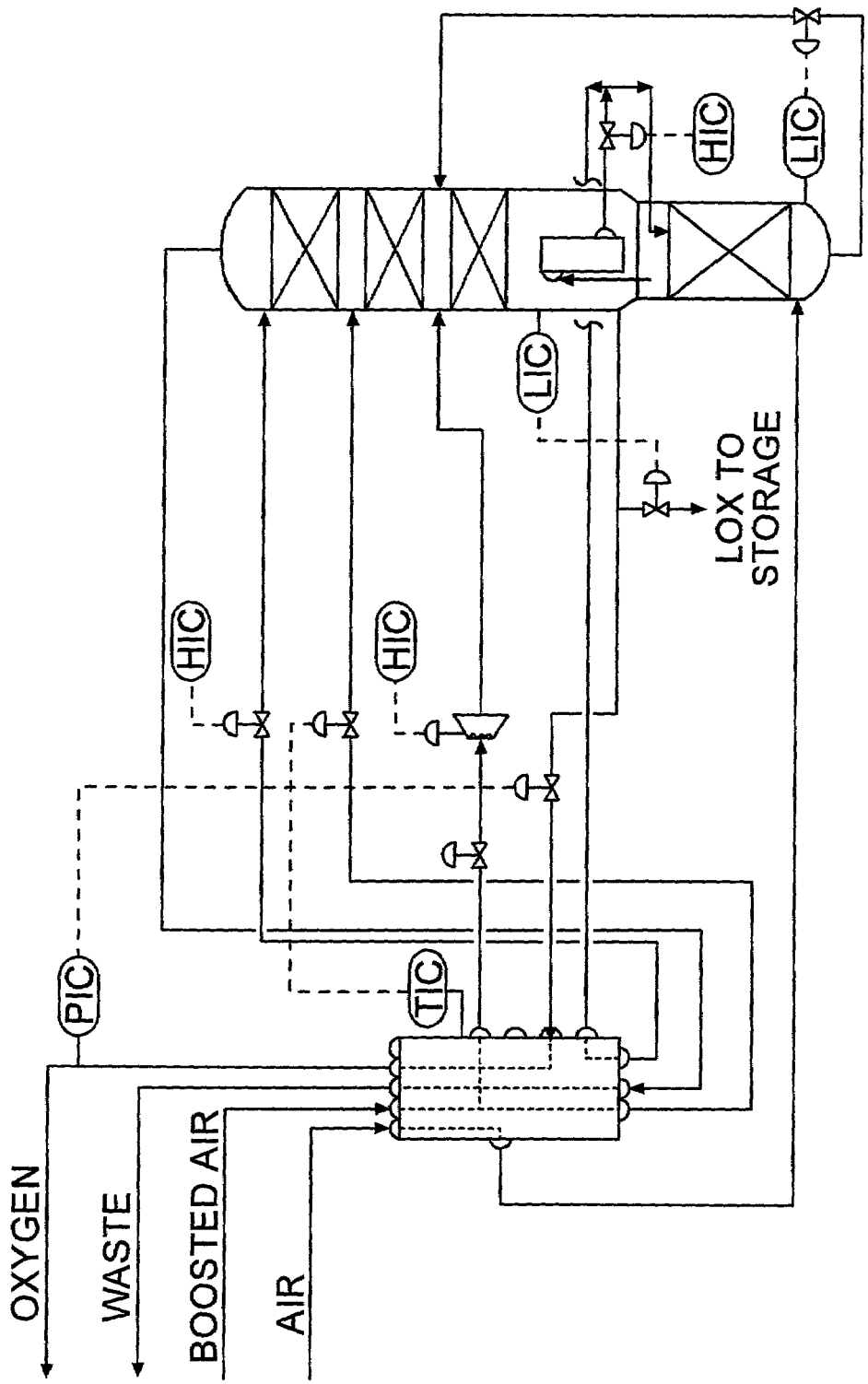
FIG. 6 is a schematic flowsheet for the cryogenic air separation process cycle for product line code 1 according to the example embodiment of the present invention.
Figure 7:
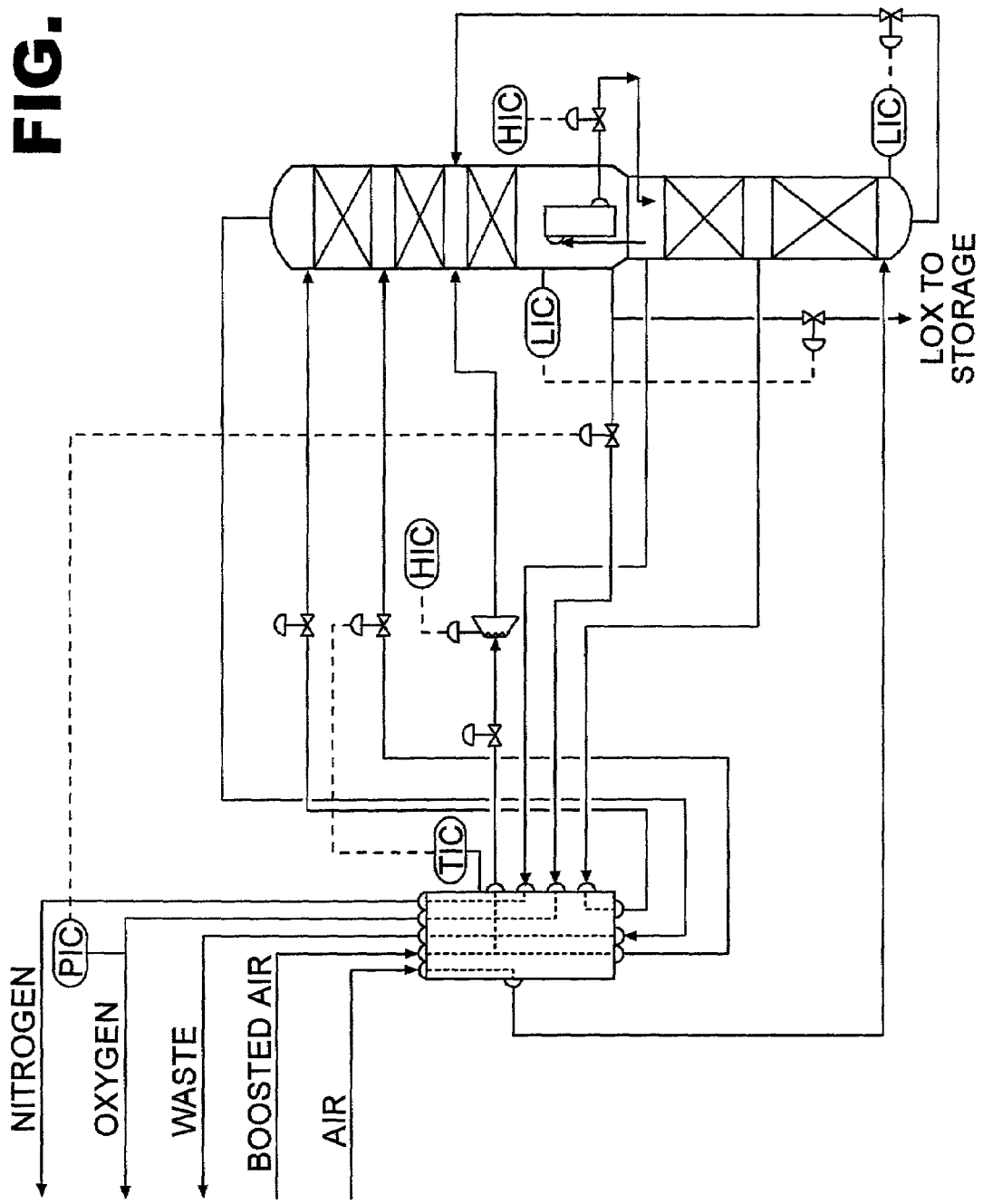
FIG. 7 is a schematic flowsheet for the cryogenic air separation process cycle for product line code 2 according to the example embodiment of the present invention.
Figure 8:
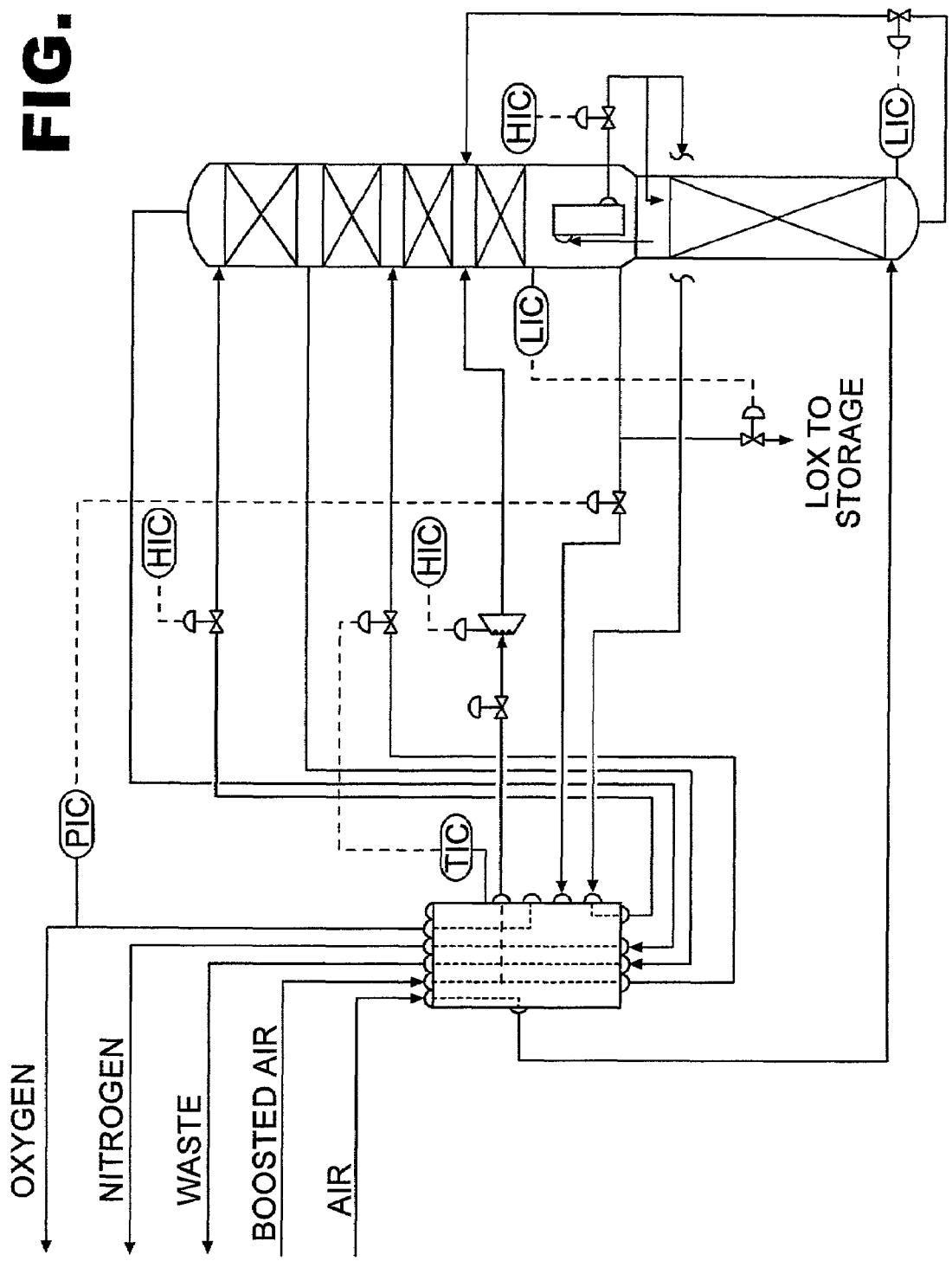
FIG. 8 is a schematic flowsheet for the cryogenic air separation process cycle for product line code 3 according to the example embodiment of the present invention.

The process plants described above may be designated in terms of the nominal maximum plant production rates. In actual operation, however, each individual plant is designed to operate over a range of production rates to allow the increases and decreases in production rates which may occur in actual plant operation. FIG. 3 shows the oxygen plant production ranges for the example product line codes 0 through 5 given above in Tables 1, 2, and 3. FIG. 4 shows the corresponding information for the example nitrogen product line codes 5 through 9. It is seen that each plant can operate nominally over a range of production capacities. In this example, the selected engineered components are defined to allow each plant to operate over the indicated ranges of production rates at acceptable operating efficiency. Operating efficiency of a process plant may include the total expendable cost of plant operation including, e.g., power, utilities, consumables, wages, etc., which may be expressed per unit plant product output.

In the above example, a total of 106 individual process plants would be required for the product lines described above if each plant were individually custom-designed for prospective buyers. A large number of engineered components would be required for these custom-designed plants, and the engineering costs for such a design approach would be prohibitive. The present invention addresses this potential situation by providing a smaller number of repeatable engineered components which can be used within product lines as well as across product lines.

In the example embodiment, the information developed above for Tables 1–4 may be generated in electronic form and may be stored electronically in product line and process design document file location 7 of FIGS. 1 and 2 and/or in parallel design document file location 7' in the exemplary electronic document and data management system of FIG. 2.

(b) Prepare a General Process Design for Each Process Plant in the Process Plant Product Lines.

Figure 11:
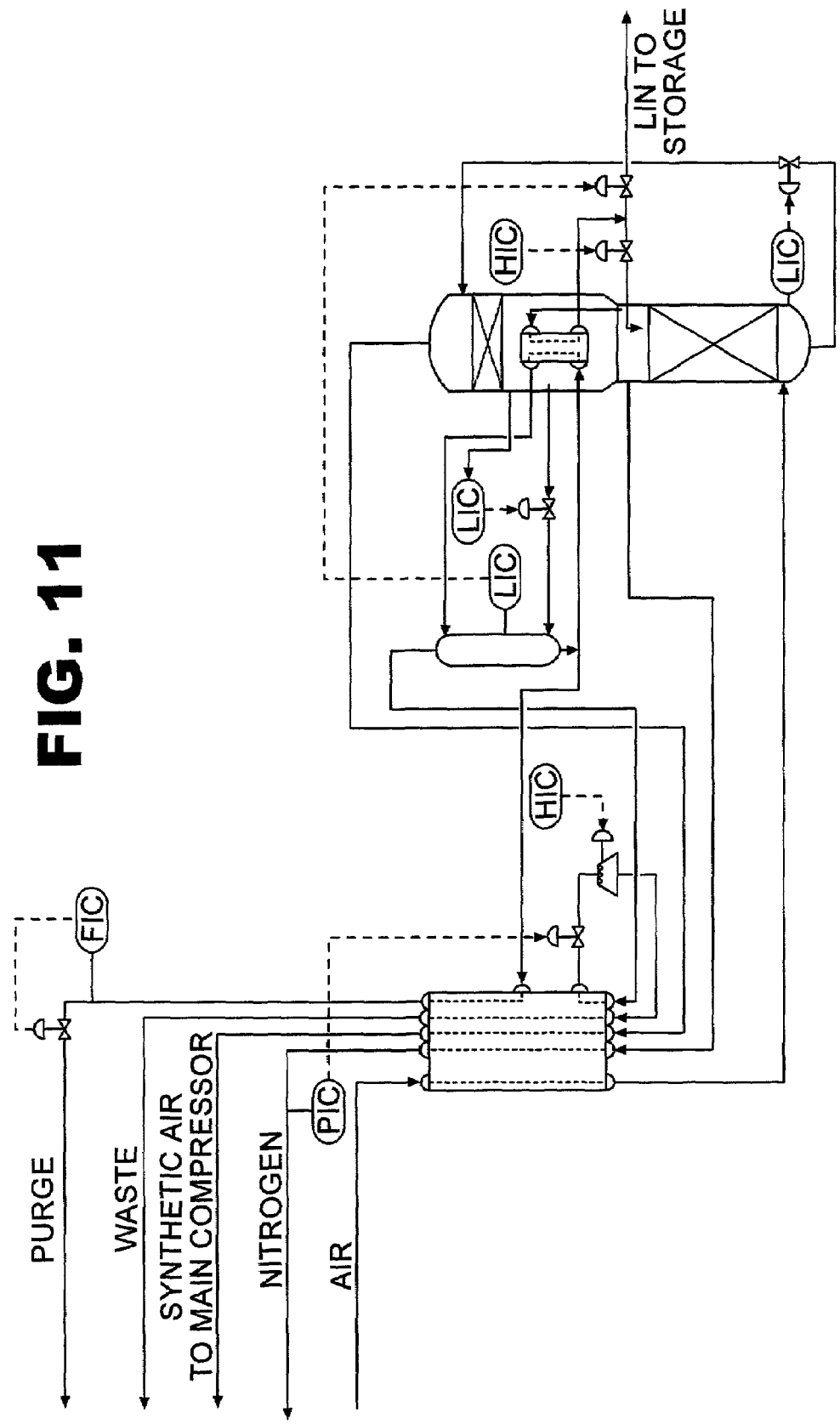
FIG. 11 is a schematic flowsheet for the cryogenic air separation process cycle for product line codes 6 and 7 according to the example embodiment of the present invention.
Figure 12:
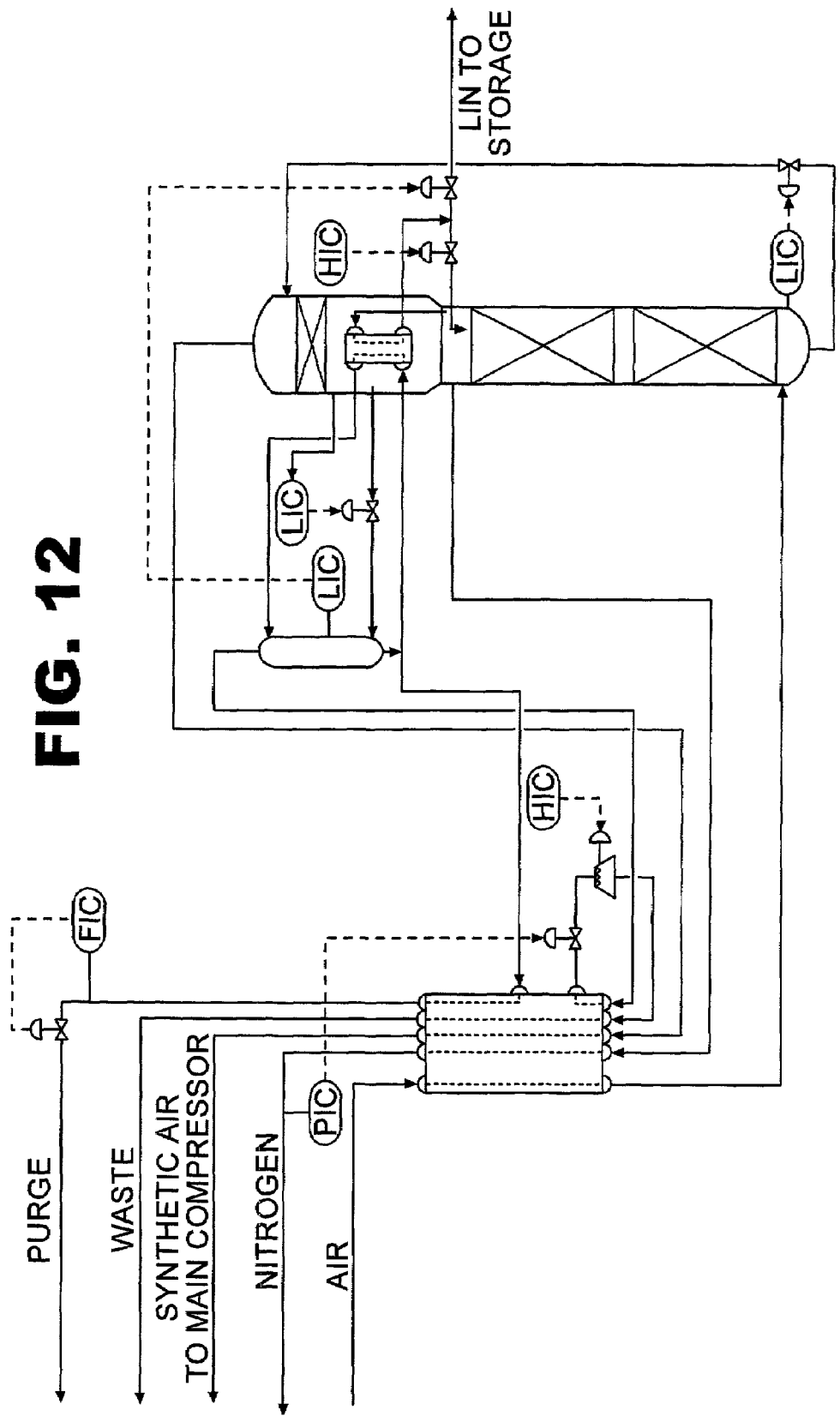
FIG. 12 is a schematic flowsheet for the cryogenic air separation process cycle for product line code 8 according to the example embodiment of the present invention.
Figure 13:
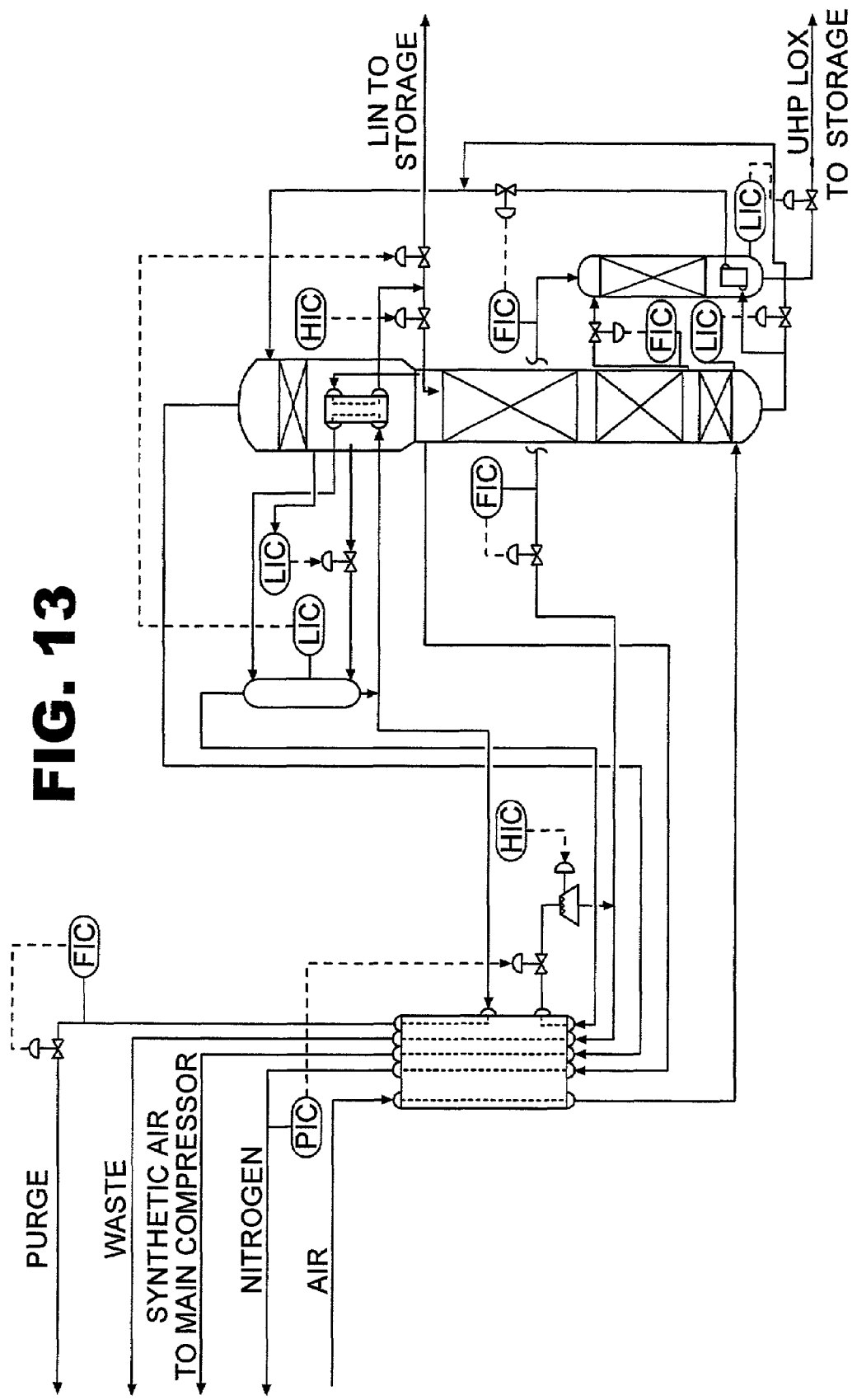
FIG. 13 is a schematic flowsheet for the cryogenic air separation process cycle for product line code 9 according to the example embodiment of the present invention.

In the next step of the example method, designated as step 5 in the flowchart of FIG. 1, a general process design may be prepared for each product line and the final process design information may be generated electronically. The electronic information may be stored in product line and process design document file location 7 of FIGS. 1 and 2 and/or in parallel design document file location 7' in the exemplary electronic document and data management system of FIG. 2. A specific process cycle may be utilized for each of the product lines described above. For product line codes 0, 1, 2, 3, 4, and 5, the LOX boil cycles of FIGS. 5, 6, 7, 8, 9, and 10, respectively, may be utilized. For product line codes 6, 7, 8, and 9, the nitrogen cycles of FIGS. 11, 11, 12, and 13, respectively, may be utilized. Options are available in which is liquid oxygen is directly injected into the system to provide refrigeration rather than utilizing the expansion turbines shown in FIGS. 5–10. This option, typically described as LOX-assist, can be used for product line codes 0, 2, 3, 4, and 5; in these options, no liquid is produced and gaseous nitrogen make can be up to 20% greater than shown in Table 1. In another option, the use of pumped LOX can be added to the process cycles of FIGS. 6–10 to deliver gaseous oxygen product at pressures up to 25 barg for product line codes 1, 2, 3, 4, and 5 respectively.

General process designs as described above may be prepared for the cycles of FIGS. 5 through 13 in electronic form and stored electronically in product line and process design document file location 7 of FIGS. 1 and 2 and/or in parallel document file location 7' in the exemplary electronic document and data management system of FIG. 2.

(c) Divide Each of the General Process Designs of (b) into a Plurality of Engineered Components.

In order to reduce the amount of detailed engineering design which would be required to offer 106 individual plants to prospective buyers on a custom basis, the next step of the example method is to divide the general process designs prepared for the process cycles of FIGS. 5 through 13 into engineered components. This is step 9 in the flowchart of FIG. 1. The results are given in Table 5, which summarizes the engineered components used for generic design of these process plants. The engineered components may be selected from the engineered systems and equipment items listed in this Table.

TABLE 5

Engineered Systems and Equipment for Air Separation Process Plants

| Engineered Systems and Subsystems | Equipment Items |
|---|---|
| Main Air Compression System | Electric Motors |
| Air Booster Compression System | Inlet Filters |
| Product Compression System (Oxygen) | Turboexpander(s) |
| Product Compression System (Nitrogen) | Liquid Oxygen Pumps |
| Expander System | Main Heat Exchanger |
| Pump Box System | Reboilers |
| Cold Enclosure System | Dump Vaporizers |
| Distillation Column System | Adsorber Vessels |
| Interconnection Piping Systems | Vent Silencers |
| Process Module System | Regeneration Heaters |
| Feed Air Treatment (TSA System) | |
| Control and Analyzer Systems | |
| Product Piping System | |
| Distillation Column Sections | |

Figure 14:
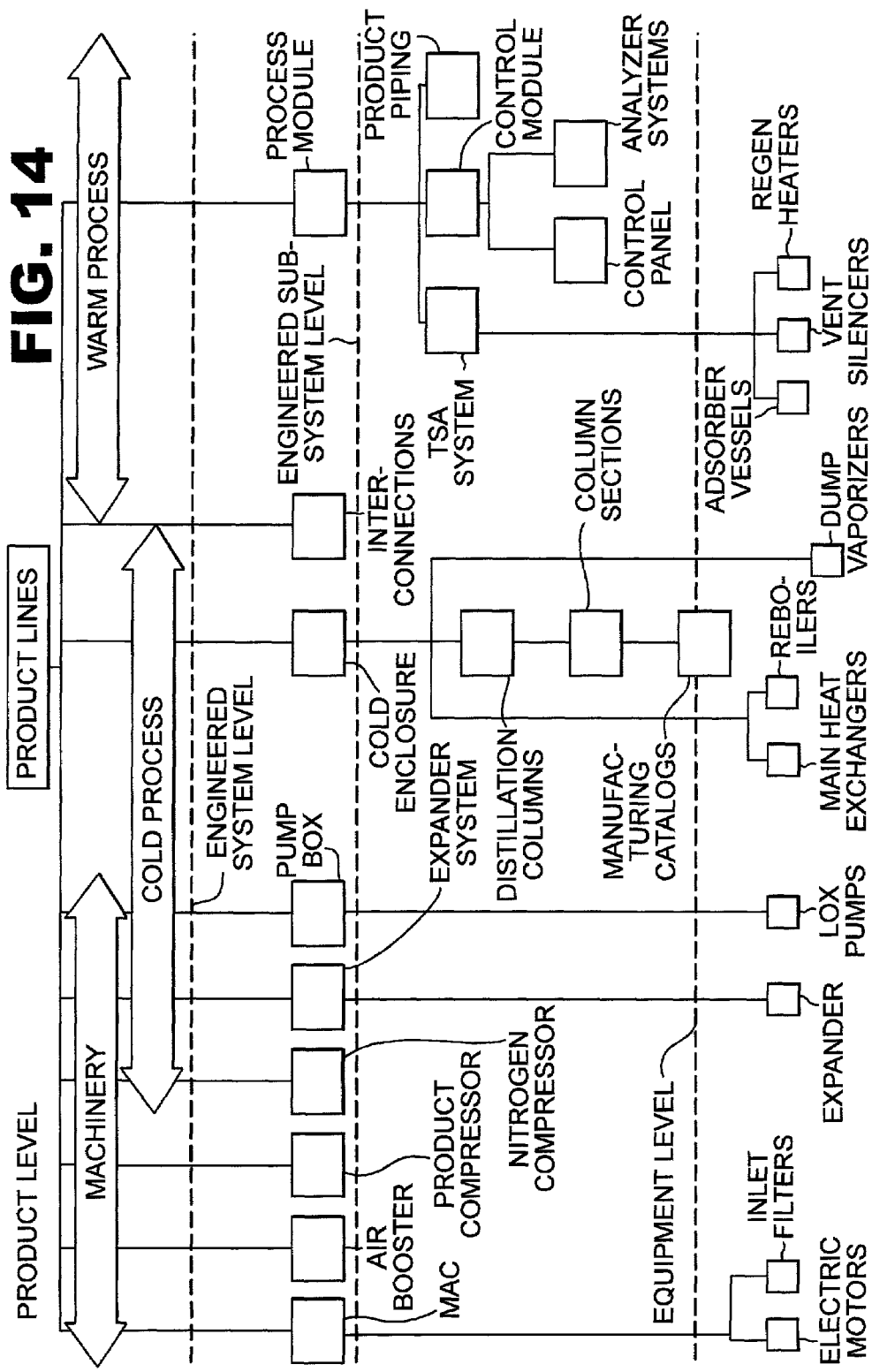
FIG. 14 is a schematic illustration of the engineered components in the machinery, cold process, and warm process categories of an air separation plant according to an example embodiment of the present invention.

The engineered components of Table 5 are shown schematically in FIG. 14 to illustrate the machinery, cold process, and warm process categories of the components. As described above, engineered components may include, engineered systems, engineered sub-systems, and individual equipment as shown in FIG. 14. The number and process characteristics of each of these components are set to allow the selection of the minimum number of repeatable engineered components which minimizes the detailed engineering cost component of each future process plant, while still enabling the preparation of acceptable preliminary cost estimates for sales proposals and allows acceptable plant operation efficiency. An example of the determination of the minimum number of repeatable engineered components in Table 5 is discussed below.

(d) Determine a Minimum Number of Repeatable Engineered Components and the Process Attributes Required for Future General Process Designs.

The minimum number of repeatable engineered components is determined in step 11 of FIG. 1 from, for example, the engineered components described above such that these repeatable engineered components can be utilized in future general process designs within and across product lines. The selection of this minimum number of repeatable engineered components allows acceptable accuracy in preliminary estimates of capital cost and operating efficiency used in preparing preliminary sales proposals to prospective buyers. Acceptable accuracy may be, for example, ±5% of the actual capital cost and the actual operating efficiency of the completed operating plant. The capital cost of a process plant may include the total cost of all engineered components, materials, and manpower for construction, engineering, project management and administration.

Selection of the minimum number of repeatable components may be dictated by acceptable operating flexibility and efficiency of each process plant which is eventually designed and commissioned. For example, in selecting the minimum number of feed air compression systems and their process attributes, the compressor efficiency of each compression system selected for each process plant should allow acceptable plant efficiency and flexibility over the operating range of the plant. A custom design of each individual process plant would allow selection of the most efficient compression system for that plant. However, with 106 plants in the product lines described above, this would require a large number of compression systems. Thus, the selection of the minimum number and process attributes of compression systems for the 106 plants in the product lines is a balance or optimum between plant operating efficiency, which should be maximized, and plant capital cost, which should be minimized. Selection of the minimum number of other repeatable components also follows this design philosophy.

Generally, the larger the number of repeatable engineered components, the more accurate the preliminary capital cost estimates will be and the more efficient the predicted and actual plant operation will be. However, a larger number of repeatable engineered components may require a greater amount of engineering design work in preparing the future detailed design of each process plant, thereby increasing the capital cost. Thus, as discussed below, the selection of the minimum number of repeatable engineered components is an optimization which, for example, minimizes the detailed engineering cost component of each future process plant actually sold and commissioned, while enabling the preparation of acceptable preliminary cost estimates for sales proposals and allowing acceptable operating efficiency of each commissioned process plant. The tradeoff for an acceptable reduction in plant efficiency is a desirable reduction in plant capital cost.

In the example embodiment, the repeatable engineered components are defined based on analysis of the engineered components of Table 5. The main repeatable engineered components defined in this analysis are given in Table 6. Other repeatable engineered components can be added as desired.

TABLE 6

Repeatable Engineered Systems and Equipment for Air Separation Process Plants

1) Distillation column system
2) Cold enclosure system
3) Reboiler
4) Main heat exchanger
5) Main air compressor
6) Air booster compressor
7) Adsorber vessels for feed air cleanup
8) Expander system
9) Process module system Non-repeatable engineered components include, for example, site-specific items such as site preparation, civil engineering, foundations, electrical switchgear and supply systems, and cooling water systems.

Definition of the minimum number of repeatable engineered components for each of the categories in Table 6 according to the example embodiment is discussed below.

1) Distillation Column Sections

The design of the high pressure (HP) and low pressure (LP) distillation columns of air separation process systems such as those illustrated by FIGS. 5–13 may be carried out in accordance with the example embodiment of the present invention by dividing generic HP and LP columns into upper, middle, and lower sections. In addition, supplemental column sections may be utilized for high nitrogen make. These supplemental column sections are known as "top hats" and are indicated in Table 8. In the plurality of process plants summarized in the matrix of Table 3, the actual HP and LP columns of each process plant may require one, two, or three sections depending on the required production rate and product purity.

The custom design of distillation columns for the 56 plants defined above would require over 200 column sections, each of which would have a specific height containing a specific number and type of mass transfer devices (trays, structured packing, or combinations thereof, and each of which would have a specific diameter. The height and diameter of each section would be selected by conventional engineering methods consistent with the type of mass transfer devices, the specific design correlations used, and the designer's philosophy of design safety factors.

In accordance with the example embodiment of the present invention, 49 individual column sections, each having a specific diameter and height, are designated for use in appropriate combinations for the process plants in the product lines of Table 3. The additional product lines of Table 4 also can utilize these designated sections. A summary matrix is given in Table 7 which indicates the individual combinations of section diameter and section height designated for use in the product lines defined in Tables 3 and 4. The section diameters are represented by diameter codes 1 through 12, which represent column diameters from 525 mm to 1600 mm, and section heights are represented by height codes A through F which represent heights between 1650 mm and 9300 mm. In the example embodiment, the actual diameter and height of each designated section will depend upon the designer's selection of mass transfer devices for that section, which can include trays, structured packing, or combinations of trays and structured packing.

TABLE 7

Matrix of Column Section Diameters and Section Heights

| Diameter Code | Height Code | | | | | |
|---|---|---|---|---|---|---|
| | A | B | C | D | E | F |
| 1  | X |   | X |   | X |   |
| 2  |   | X | X |   |   |   |
| 3  | X | X | X | X |   |   |
| 4  | X | X | X | X | X | X |
| 5  |   | X | X | X |   |   |
| 6  | X | X | X | X | X | X |
| 7  |   | X | X | X |   |   |
| 8  | X | X | X | X | X | X |
| 9  |   | X | X | X | X | X |
| 10 |   | X | X | X | X |   |
| 11 |   | X | X | X | X | X |
| 12 |   | X | X | X |   |   |

The column sections of Table 7 are utilized in the product lines of Table 3 as shown in Table 8, which is a matrix of column sections for each plant in the product lines. These 49 different column sections, which are unique combinations of section heights and column diameters, represent the minimum number of engineered components for the distillation columns of all defined product lines in accordance with the example embodiment of the present invention.

TABLE 8

Process Plant Distillation Column Section Matrix

| | | High Pressure Column | | | | | | Low Pressure Column | | | | | | Top Hat | |
|---|---|---|---|---|---|---|---|---|---|---|---|---|---|---|---|
| | | Lower | | Middle | | Upper | | Lower | | Middle | | Upper | | | |
| Plant Cap. Code | Prod. Line Code | Height Code | Diam. Code | Height Code | Diam. Code | Height Code | Diam. Code | Height Code | Diam. Code | Height Code | Diam. Code | Height Code | Diam. Code | Height Code | Diam. Code |
| JO | 0 | C | 10 | | | | | B | 12 | | | C | 12 | | |
| JO | 1 | C | 10 | | | | | B | 12 | B | 12 | B | 12 | | |
| JO | 2 | C | 11 | | | B | 11 | B | 12 | B | 12 | B | 12 | | |
| JO | 3 | E | 10 | | | | | B | 12 | B | 12 | B | 12 | C | 10 |
| JO | 4 | C | 11 | | | B | 11 | D | 12 | C | 12 | B | 12 | | |
| JO | 5 | E | 10 | | | | | D | 12 | C | 12 | B | 12 | C | 10 |
| GO | 0 | C | 8 | | | | | B | 10 | | | C | 10 | | |
| GO | 1 | C | 8 | | | | | B | 10 | B | 10 | B | 10 | | |
| GO | 2 | C | 9 | | | B | 9 | B | 10 | B | 10 | B | 10 | | |
| GO | 3 | E | 8 | | | | | B | 10 | B | 10 | B | 10 | C | 8 |
| GO | 4 | C | 9 | | | B | 9 | D | 10 | C | 10 | B | 10 | | |
| GO | 5 | E | 8 | | | | | D | 10 | C | 10 | B | 10 | C | 8 |
| LN | 6 | E | 11 | | | | | | | | | A | 8 | | |
| LN | 7 | F | 11 | | | | | | | | | A | 8 | | |
| LN | 8 | E | 11 | | | E | 11 | | | | | A | 8 | | |
| LN | 9 | B | 11 | D | 11 | E | 11 | | | | | A | 8 | | |
| EO | 0 | C | 6 | | | | | B | 9 | | | C | 9 | | |
| EO | 1 | C | 6 | | | | | B | 9 | B | 9 | B | 9 | | |
| EO | 2 | C | 8 | | | B | 8 | B | 9 | B | 9 | B | 9 | | |
| EO | 3 | E | 6 | | | B | 8 | B | 9 | B | 9 | B | 9 | C | 6 |
| EO | 4 | C | 8 | | | | | D | 9 | C | 9 | B | 9 | | |
| EO | 5 | E | 6 | | | | | D | 9 | C | 9 | B | 9 | C | 6 |
| KN | 6 | E | 9 | | | | | | | | | A | 6 | | |
| KN | 7 | E | 9 | | | | | | | | | A | 6 | | |
| KN | 8 | F | 9 | | | E | 9 | | | | | A | 6 | | |
| KN | 9 | B | 9 | D | 9 | E | 9 | | | | | A | 6 | | |
| CO | 0 | C | 4 | | | | | B | 7 | | | C | 7 | | |
| CO | 1 | C | 4 | | | | | B | 7 | B | 7 | B | 7 | | |
| CO | 2 | C | 6 | | | | | B | 7 | B | 7 | B | 7 | | |
| CO | 3 | E | 4 | | | B | 6 | B | 7 | B | 7 | B | 7 | C | 4 |
| CO | 4 | C | 6 | | | | | D | 7 | C | 7 | B | 7 | | |
| CO | 5 | E | 4 | | | B | 6 | D | 7 | C | 7 | B | 7 | C | 4 |
| HN | 6 | E | 8 | | | | | | | | | A | 4 | | |
| HN | 7 | F | 8 | | | | | | | | | A | 4 | | |
| HN | 8 | E | 8 | | | E | 8 | | | | | A | 4 | | |
| HN | 9 | B | 8 | D | 8 | E | 8 | | | | | A | 4 | | |
| BO | 0 | C | 3 | | | | | B | 5 | | | C | 5 | | |
| BO | 1 | C | 3 | | | | | B | 5 | B | 5 | B | 5 | | |
| BO | 2 | C | 4 | | | B | 4 | B | 5 | B | 5 | B | 5 | | |
| BO | 3 | E | 3 | | | | | B | 5 | B | 5 | B | 5 | C | 3 |
| BO | 4 | C | 4 | | | B | 4 | D | 5 | C | 5 | B | 5 | | |
| BO | 5 | E | 3 | | | | | D | 5 | C | 5 | B | 5 | C | 3 |
| FN | 6 | E | 6 | | | | | | | | | | | | |
| FN | 7 | F | 6 | | | | | | | | | | | | |
| FN | 8 | E | 6 | | | E | 6 | | | | | | | | |
| FN | 9 | B | 6 | D | 6 | E | 6 | | | | | | | | |
| AO | 0 | C | 1 | | | | | B | 3 | | | C | 3 | | |
| AO | 1 | C | 1 | | | | | B | 3 | B | 3 | B | 3 | | |
| AO | 2 | C | 2 | | | B | 2 | B | 3 | B | 3 | B | 3 | | |
| AO | 3 | E | 1 | | | | | B | 3 | B | 3 | B | 3 | C | 1 |
| AO | 4 | C | 2 | | | B | 2 | D | 3 | C | 3 | B | 3 | | |
| AO | 5 | E | 1 | | | | | D | 3 | C | 3 | B | 3 | C | 1 |
| DN | 6 | E | 4 | | | | | | | | | A | 1 | | |
| DN | 7 | F | 4 | | | | | | | | | A | 1 | | |
| DN | 8 | E | 4 | | | E | 4 | | | | | A | 1 | | |
| DN | 9 | B | 4 | B | 4 | E | 4 | | | | | A | 1 | | |

The number of column sections defined above is based on the plant product lines defined in Tables 3 and 4. Other plant product lines can be defined, and these could require a different number of column sections.

2) Cold boxes

Cold boxes may be utilized as the insulated enclosures for the distillation columns, main heat exchangers, and reboilers of the process plant product lines described above in Tables 4 and 5. Exemplary width and depth dimensions of the cold boxes are summarized in Table 9, and the box heights are summarized in Table 10.

TABLE 9

Cold Box Horizontal Dimensions (mm)

| Plant Capacity Code | Box Width | Box Depth | |
|---|---|---|---|
| | | Bottom Section | Top Section |
| AO | 2200 | 2600 | 1700 |
| BO | 2500 | 2700 | 1800 |
| CO | 2700 | 3100 | 2000 |
| DN | 2400 | 2700 | 1700 |
| EO | 3000 | 3500 | 2200 |
| FN | 2500 | 2800 | 1900 |
| GO | 3300 | 3900 | 2400 |
| HN | 2800 | 3100 | 2100 |
| JO | 3700 | 4800 | 2700 |
| KN | 3000 | 3500 | 2200 |
| LN | 3500 | 4100 | 2500 |

TABLE 10

Cold Box Height (mm)

| Product Line Code | Box Height |
|---|---|
| 0 | 24000 |
| 1 | 27000 |
| 2 | 32000 |
| 3 | 36000 |
| 4 | 35000 |
| 5 | 40000 |
| 6 | 22000 |
| 7 | 24000 |
| 8 | 32000 |
| 9 | 34000 |

These example dimensions could change if the process plant product lines defined above in Tables 4 and 5 were changed.

Cold cans (i.e., cylindrical enclosures) may be utilized for the four additional plants which are variants of cases 0, 2, 3, 4, and 5 of Table 1, which plants produce no liquid product.

3) Reboilers

The reboiler is a plate-and-fin type of thermosiphon heat exchanger which is submerged in the oxygen-rich liquid in the sump of the low pressure column. The exchanger is manifolded so that nitrogen vapor from the high pressure column is condensed in selected flow channels by indirect heat exchange with boiling liquid in other channels. Nitrogen flows vertically and parallel to the plates, which are oriented vertically.

The plates in the exchanger have a common length (i.e., vertical dimension) for all plant capacities. The plate width and number of plates in the stack vary depending on the flow capacity of the plant. The term "height" is used to define the dimension of the stack in the direction normal to the plates. The stack height to width ratio and effective nitrogen flow velocity preferably are kept constant as the reboiler size varies. The effective nitrogen flow velocity is selected by the designer based on the actual type of plate-and-fin exchanger used and the desired operational characteristics of the reboiler and distillation system. Two header types are used, one for plants in which oxygen is the main product and another for plants in which nitrogen is the main product.

Table 11 is a matrix of example reboiler designs as a function of the plant capacity codes earlier defined. Eleven reboiler designs are set forth which have a common length and share two header designs.

TABLE 11

Reboiler Design Matrix

| Plant Capacity Code | Width Code | Height Code | Length Code | Header Type Code |
|---|---|---|---|---|
| AO | W1 | H1 | L | O |
| BO | W2 | H2 | L | O |
| CO | W3 | H3 | L | O |
| DN | W4 | H4 | L | N |
| EO | W5 | H5 | L | O |
| FN | W6 | H6 | L | N |
| GO | W7 | H7 | L | O |
| HN | W8 | H8 | L | N |
| JO | W9 | H9 | L | O |
| KN | W10 | H10 | L | N |
| LN | W11 | H11 | L | N |

4) Main Heat Exchangers

The main heat exchanger is a plate-and-fin type of heat exchanger which cools feed air against cold process streams from the distillation column. Fluid flow is vertical, either upward ort downward, and flow is parallel to the plates, which are oriented vertically.

The plates in the exchanger have a common length (i.e., vertical dimension) for all plant capacities and product lines. The plate width and number of plates in the stack may vary depending on the flow capacity and product slate of the plant. "Height" is the dimension of the stack in the direction normal to the plates. The stack height to width ratio and effective fluid flow velocities preferably are kept constant as the exchanger size varies. The effective fluid flow velocities are selected by the designer based on, for example, the actual type of plate-and-fin exchanger used and the desired operational characteristics of the distillation system.

Table 12 is a matrix of example main heat exchanger designs for the plant capacity codes and product line codes described above. The exchanger widths and heights of the example exchangers yield 11 different exchanger sizes for the plant capacities. Header design is determined by the product slates, and four different header designs are used for the defined product lines. In this example, a total of 29 main heat exchanger designs are used for the 56 individual plants of Table 12.

TABLE 12

Main Heat Exchanger Matrix

| Plant Capacity Code | Product Line Code | Width Designation | Height Designation | Length Designation | Header Designation |
|---|---|---|---|---|---|
| AO | 0 | WA | HA | L | H0 |
| AO | 1 | WA | HA | L | H1 |
| AO | 2 | WA | HA | L | H2 |
| AO | 3 | WA | HA | L | H3 |
| AO | 4 | WA | HA | L | H2 |

TABLE 12-continued

Main Heat Exchanger Matrix

| Plant Capacity Code | Product Line Code | Width Designation | Height Designation | Length Designation | Header Designation |
|---|---|---|---|---|---|
| AO | 5 | WA | HA | L | H0 |
| BO | 0 | WB | HB | L | H0 |
| BO | 1 | WB | HB | L | H1 |
| BO | 2 | WB | HB | L | H2 |
| BO | 3 | WB | HB | L | H3 |
| BO | 4 | WB | HB | L | H2 |
| BO | 5 | WB | HB | L | H3 |
| CO | 0 | WC | HC | L | H0 |
| CO | 1 | WC | HC | L | H1 |
| CO | 2 | WC | HC | L | H2 |
| CO | 3 | WC | HC | L | H3 |
| CO | 4 | WC | HC | L | H2 |
| CO | 5 | WC | HC | L | H3 |
| DN | 6 | WD | HD | L | H6 |
| DN | 7 | WD | HD | L | H6 |
| DN | 8 | WD | HD | L | H6 |
| DN | 9 | WD | HD | L | H6 |
| EO | 0 | WE | HE | L | H0 |
| EO | 1 | WE | HE | L | H1 |
| EO | 2 | WE | HE | L | H2 |
| EO | 3 | WE | HE | L | H3 |
| EO | 4 | WE | HE | L | H2 |
| EO | 5 | WE | HE | L | H3 |
| FN | 6 | WF | HF | L | H6 |
| FN | 7 | WF | HF | L | H6 |
| FN | 8 | WF | HF | L | H6 |
| FN | 9 | WF | HF | L | H6 |
| GO | 0 | WG | HG | L | H0 |
| GO | 1 | WG | HG | L | H1 |
| GO | 2 | WG | HG | L | H2 |
| GO | 3 | WG | HG | L | H3 |
| GO | 4 | WG | HG | L | H2 |
| GO | 5 | WG | HG | L | H3 |
| HN | 6 | WH | HH | L | H6 |
| HN | 7 | WH | HH | L | H6 |
| HN | 8 | WH | HH | L | H6 |
| HN | 9 | WH | HH | L | H6 |
| JO | 0 | WJ | HJ | L | H0 |
| JO | 1 | WJ | HJ | L | H1 |
| JO | 2 | WJ | HJ | L | H2 |
| JO | 3 | WJ | HJ | L | H3 |
| JO | 4 | WJ | HJ | L | H2 |
| JO | 5 | WJ | HJ | L | H3 |
| KN | 6 | WK | HK | L | H6 |
| KN | 7 | WK | HK | L | H6 |
| KN | 8 | WK | HK | L | H6 |
| KN | 9 | WK | HK | L | H6 |
| LN | 6 | WL | HL | L | H6 |
| LN | 7 | WL | HL | L | H6 |
| LN | 8 | WL | HL | L | H6 |
| LN | 9 | WL | HL | L | H6 |

5) Main Air Compressors

Main air compressors are selected to provide feed air for each of the process plant capacities such that common components can be used when possible. In this example, seven compressor frame size and driver combinations are selected to supply the 11 plant sizes as summarized in Table 13. Different compressor wheels are used in plants BO and DN with a common frame size/driver combination. In addition, different compressor wheels are used in plants CO, EO, and KN with a common frame size/driver combination. Also, different compressor wheels are used in plants GO and LN with a common frame size/driver combination.

TABLE 13

Main Air Compressors

| Plant Capacity Code | Compressor Frame Size/ Driver Code | Maximum Flow and Discharge Pressure at Design Point | |
|---|---|---|---|
| | | Maximum flow, Nm3/hr | Discharge Pressure, barg |
| AO | CFD1 | 6651 | 5.0 |
| BO | CFD2 | 9591 | 5.0 |
| CO | CFD3 | 13385 | 5.0 |
| DN | CFD2 | 5072 | 6.4 |
| EO | CFD3 | 18521 | 5.0 |
| FN | CFD4 | 7608 | 6.4 |
| GO | CFD5 | 26450 | 5.0 |
| HN | CFD6 | 10144 | 6.4 |
| JO | CFD7 | 36923 | 5.0 |
| KN | CFD3 | 15205 | 6.4 |
| LN | CFD5 | 21963 | 6.4 |

Notes:
1) Compressors may be centrifugal integrally geared machines supplied by vendors such as Cooper, Atlas Copco, and Demag
2) Maximum design flow may be reduced by up to 40% when lower product volumes are needed
3) Flows for plant codes DN, FN, HN, KN, and LN are based on a nitrogen product pressure of 5.6 barg.

Thus, in the example embodiment, the minimum number of repeatable main air compressor frame/driver combinations is seven.

6. Air Booster Compressors

In the example embodiment, air booster compressors are used for plant codes AO, BO, CO, EO, GO, and JO. The selected compressor types and the design point maximum flow and discharge pressure specifications are summarized in Table 14.

TABLE 14

Air Booster Compressors

| Plant Capacity Code | Booster Compressor Type | Maximum Flow and Discharge Pressure at Design Point | |
|---|---|---|---|
| | | Maximum flow, Nm3/hr | Discharge Pressure, barg |
| AO | Roots blower | 1774 | 5.9 |
| BO | Roots blower | 2598 | 5.9 |
| CO | Roots blower | 3664 | 5.8 |
| EO | Roots blower | 5041 | 6.0 |
| GO | Roots blower | 7209 | 6.1 |
| JO | Centrifugal (1) | 10073 | 6.1 |

(1) Additional wheel on main air compressor

7. Adsorber Vessels for Feed Air Purification System

Temperature swing adsorption (TSA) or temperature-pressure swing adsorption (TPSA) systems remove water, carbon dioxide, and other low-concentration contaminants from the compressed feed air to prevent freezout and operating safety problems in the cold sections of the plants. The choice of TSA or TPSA may be dictated by the ambient atmospheric conditions at the plant site and the operating requirements of the particular plant. The typical TSA or TPSA system utilizes two parallel adsorber vessels which operate according to conventional adsorption process cycles.

A design parameter in the design of the TSA or TPSA systems and a factor in the capital cost is the diameter and the tangent-to-tangent dimension of the adsorber vessels. Example dimensions of the adsorber vessels for each of the plant capacity codes are summarized in Table 15.

TABLE 15

Adsorber Vessel Dimensions

| Plant Capacity Code | Adsorber Diameter, mm. |
|---|---|
| AO | 1600 |
| BO | 2000 |
| CO | 2300 |
| DN | 1600 |
| EO | 3000 |
| FN | 2000 |
| GO | 3300 |
| HN | 2300 |
| JO | 3900 |
| KN | 3000 |
| LN | 3300 |

When a TPSA cycle is selected, the tangent-to-tangent dimension may be, for example, 3300 mm. When a TSA cycle is selected, the tangent-to-tangent dimension may be, for example, 4200 mm.

Thus, in the example embodiment, the minimum number of repeatable adsorber vessel designs (i.e., vessel diameters) is 6.

8. Expanders

In the example embodiment, an expander is used in each of the process plants to provide refrigeration by work expansion of a cooled, compressed feed air stream or alternatively the work expansion of a cold product or byproduct stream from the distillation column. Turboexpanders used for work expansion can be dissipative expanders in which the work generated is dissipated by means of an air or oil brake mechanism. Alternatively, the generated work can be utilized to drive or assist in the driving of the main air compressor.

Exemplary expanders are selected for each of the process plant cases as summarized in Table 16. When oil-braked expanders are used, four expander sizes may provide the 11 different plant capacities as shown in the table. Oil-braked expanders may be utilized for the plants having capacity codes AO, BO, CO, DN, and EO, and can be used, if desired, for any plant having the capacity code FN, GO, HN, JO, KN, or LN. Alternatively, expander duty can be provided for any plant having the capacity code FN, GO, HN, JO, KN, or LN by an expander wheel on the main air compressor. In this option, three example expander sizes provide the 5 different plant capacities as shown in the table.

TABLE 16

Expanders

| | Expander Options | |
|---|---|---|
| Plant Capacity Code | Oil-Braked Expander Size Designation | Expander Wheel on Main Air Compressor Size Designation |
| AO | E1 | N/A |
| BO | E1 | N/A |
| CO | E2 | N/A |
| DN | E2 | N/A |
| EO | E2 | EW1 |
| FN | E2 | EW1 |
| GO | E2 | EW1 |
| HN | E2 | EW1 |
| JO | E3 | EW2 |
| KN | E3 | EW2 |
| LN | E4 | EW3 |

Thus, in the example embodiment, the minimum number of repeatable expanders is 4 for oil-braked expanders and 3 for the option of an expander wheel on the main air compressor. Expanders can be obtained from any of several expander vendors.

9. Process Modules

In accordance with the example embodiment of the present invention, a process module is an integrated portion of each process plant design which includes the TSA or TPSA system (excluding adsorber vessels), the plant control system, analyzers, and product piping system. Here, four basic modules are defined as part of process skids which serve the process plants in the product lines. In this example, these process skids are defined by the feed air inlet line diameters of 8, 10, 12, and 16 inches, and are utilized with the process plants defined by the plant capacity codes as indicated in Table 17.

TABLE 17

Process Module Skid Matrix

| Plant Capacity Code | Process Skid Designation (By air inlet line size, inches) | | | |
|---|---|---|---|---|
| | 8 | 10 | 12 | 16 |
| AO | X | | | |
| BO | X | | | |
| CO | X | X | | |
| DN | X | | | |
| EO | | | X | X |
| FN | X | | | |
| GO | | | X | X |
| HN | X | X | | |
| JO | | | | X |
| KN | | X | X | |
| LN | | | X | X |

This matrix indicates, for example, that the process skid designated by an 8 inch inlet line can be used for the product lines defined by plant capacity codes AO, BO, CO, DN, FN, and HN. Thus, in the example embodiment of the present invention, the minimum number of repeatable process skid modules is 4.

The information in Tables 6 through 17 may be stored in electronic format in repeatable engineered components document file location 13 of FIGS. 1 and 2 and/or in parallel repeatable engineered components document file location 13' in the exemplary electronic document and data management system of FIG. 2.

(e) Prepare a Detailed Design of a Process Plant in a Product Line.

In the example embodiment, once the minimum number of repeatable engineered components and their process attributes have been determined as described above, a first specific process plant in a product line is selected and a detailed design is prepared as indicated by step 15 of FIG. 1. This typically is done in response to an actual purchase agreement for this particular plant, and the plant specifications determined as item 17 of FIG. 1 form the basis of the detailed plant design. The general process design information utilized is retrieved from product line and process design file storage location 7 of FIGS. 1 and 2 and/or from file location 7' of FIG. 2. The repeatable engineered components for the specific process plant are selected from those previously defined. A detailed design is carried out for one or more, and perhaps all, of the selected repeatable engineered components for that plant. The detailed design information for each subcomponent may be stored for future use in electronic format in repeatable engineered components document file location 13 of FIGS. 1 and 2 and/or in repeatable engineered components document file location 13' of the exemplary electronic document and data management system of FIG. 2. The detailed design of this initially-selected process plant is carried out using the detailed designs as completed above for the repeatable engineered components and performing the detailed design of the non-repeatable engineered components. Detailed designs of the non-repeatable engineered components are then carried out, and the detailed design of the entire process plant is completed as indicated by electronic design document 19 of FIG. 1. This design document is stored in project document file location 14 in FIGS. 1 and 2 and/or in parallel project document file location 14' of the exemplary electronic document and data management system of FIG. 2.

(f) Prepare a Detailed Design of a Process Plant in Another Product Line

A process plant in another product line, i.e., a different product line, may be selected for detailed design, typically in response to the execution of another purchase contract for the process plant. The plant specifications may be obtained from item 17 of FIG. 1 and form the basis for the detailed plant design. The general process design information to be utilize is retrieved from product line and process design document file location 7 and repeatable engineered components document file location 13 of FIGS. 1 and 2, and/or from document file locations 7' and 13' of the exemplary electronic document and data management system of FIG. 2, and the detailed design then is carried out as indicated by step 21 of FIG. 1. In the example embodiment, repeatable engineered components are selected from those previously defined. For at least one of these repeatable engineered components, detailed designs were previously carried out as described above and were stored electronically in repeatable engineered components document file location 13 of FIGS. 1 and 2 and/or document file location 13' of the exemplary electronic document and data management system of FIG. 2. These available detailed designs are retrieved therefrom and used in the detailed process plant design.

Detailed designs of the components not previously designed are carried out, and the detailed design of the entire process plant is carried out by using the previously-completed detailed designs for repeatable engineered components and the detailed designs of the remaining repeatable engineered components which were not previously designed. The detailed design information for the remaining repeatable engineered components which were not previously designed may be stored for future use in electronic format in repeatable engineered components document storage location 13 of FIGS. 1 and 2 and/or in parallel project document file location 13' of the exemplary electronic document an data management system of FIG. 2. The detailed design of the entire process plant is completed as indicated by electronic design document 23 of FIG. 1. This design document may be stored in a project document file (not shown) located in data file 217 of the exemplary electronic document and data management system of FIG. 2.

(g) Prepare Additional Detailed Designs of Additional Process Plants in the Product Lines Additional detailed designs of process plants in various product lines may be carried out over time, using, e.g., plant specifications input 17 of FIG. 1, general process design information retrieved electronically from product line and process design document file location 7 in FIGS. 1 and 2 or from file location 7' in FIG. 2. Design information for repeatable engineered components is retrieved electronically from document file location 13 of FIGS. 1 and 2 or file location 13' of FIG. 2. As successive detailed designs for repeatable engineered components are completed, an increasing number of these detailed designs is accumulated and stored electronically in document file location 13 of FIGS. 1 and 2 and/or in file location 13' of FIG. 2 to be available for future designs. Each successive future design, therefore, will require less detailed design work than previous designs, thereby continually reducing the engineering design cost of each successive process plant. In the limit, after detailed design of the $N^{th}$ and final process plant (item 25, FIG. 1), each process plant in every product line will have been designed in detail at least once, the future detailed plant designs may require executing only the detail ed design of non-repeatable engineered components, and all detailed designs of the repeatable engineered components may be obtained from the engineering database.

The $N^{th}$ detailed process plant design is designated as electronic design document 27 of FIG. 1. This design document may be stored in another project document file (not shown) in data file 217 of FIG. 2.

EXAMPLE

In one example embodiment, an air separation plant is required to meet the following product requirements:

Oxygen: 4500 $Nm^3$/hr at low pressure (1.3 barg at the plant boundary), 98 vol % gas purity, with 5% LOX make Nitrogen: 300 $Nm^3$/hr at high pressure (3.7 barg), maximum 1 ppm contaminants, no LIN make Referring to Table 1, product line code 4 is selected as the product line to meet the product purity and pressure requirements. The plant size is determined from Table 2, which indicates that plant capacity code GO is required.

Figure 9:
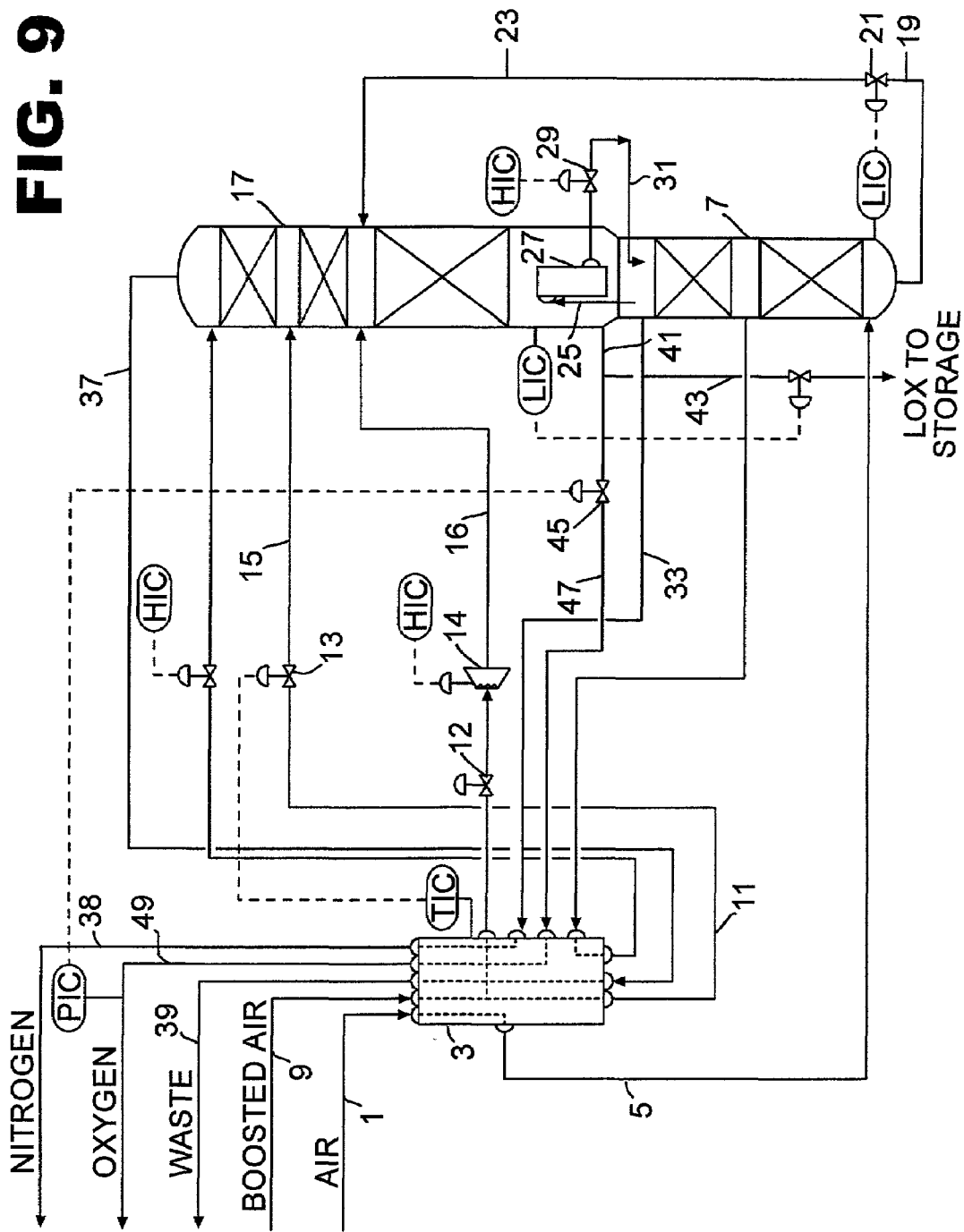
FIG. 9 is a schematic flowsheet for the cryogenic air separation process cycle for product line code 4 according to the example embodiment of the present invention.
Figure 10:
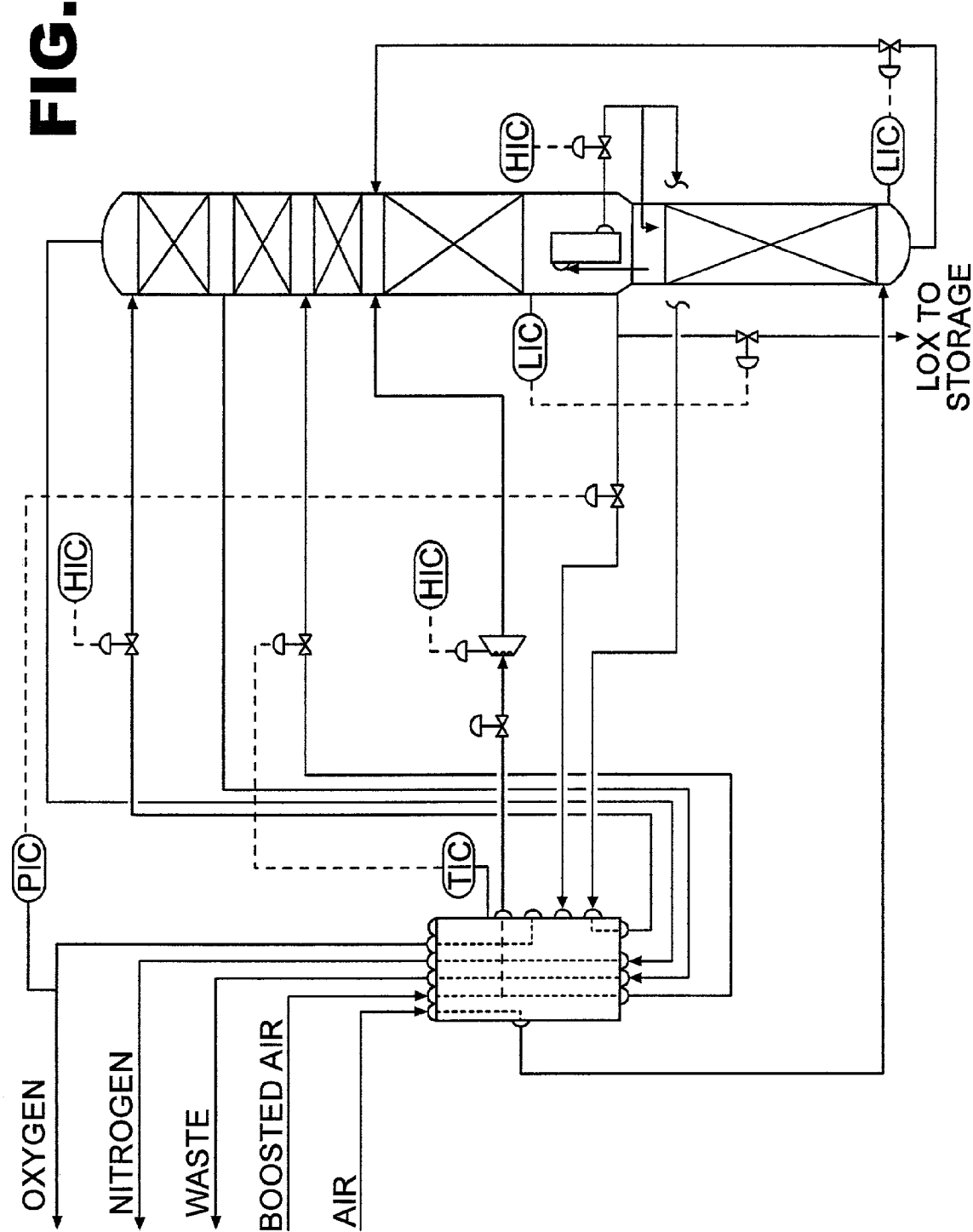
FIG. 10 is a schematic flowsheet for the cryogenic air separation process cycle for product line code 5 according to the example embodiment of the present invention.

The process cycle for this product line is shown schematically in FIG. 9, for which a brief process description follows. Purified pressurized feed air in line 1 is supplied from a main air compressor (not shown) and a front-end cleanup system (not shown) which removes water, carbon dioxide, and other contaminants from the air. Air in line 1 is provided at a pressure of 4.5 barg and a flow rate of 22,500 $Nm^3$/hr. The pressurized air feed is cooled in main heat exchanger 3 by indirect heat transfer with cold process streams (later defined) to yield cooled air feed in line 5 at a temperature near its dew point. Feed air in line 5 is introduced into high pressure distillation column 7 which contains sections of structured packing as described below.

Another stream of purified boosted pressurized feed air in line 9 is supplied from a booster air compressor (not shown) at a pressure of 5.5 barg and is partially cooled to −100° C. in main heat exchanger 3. A portion of this partially cooled air is further cooled in the exchanger to yield cooled, boosted, liquefied air in line 11. This liquid air flows through line 11, throttling valve 13, and line 15 into low pressure distillation column 17. This column, operating at 1.3 barg, contains sections of structured packing as described below. The remaining portion of partially cooled air is withdrawn through valve 12 and work expansion turbine 14, which reduces the pressure to 1.3 barg and cools the air to a temperature close to its dew point. The resulting cooled, reduced-pressure air flows through line 16 into low pressure column 17.

Oxygen-enriched liquid is withdrawn from the bottom of high pressure column 7 via line 19 and is reduced in pressure across throttling valve 21. The resulting reduced-pressure stream is introduced into low pressure distillation column 17 at an intermediate location. Nitrogen-enriched vapor is withdrawn from the top of the high pressure column via line 25, condensed against boiling liquid oxygen in reboiler-condenser 27 in the sump of low pressure column, and returned via valve 29 and line 31 as reflux into the top of high pressure column 7.

High purity nitrogen is withdrawn from the top of high pressure column 7 via line 33, warmed in main heat exchanger 3, and withdrawn via line 35 as a high purity nitrogen product. Nitrogen-enriched vapor is withdrawn from the top of low pressure column 17 via line 37, warmed in main heat exchanger 3, and withdrawn via line 39 as a waste gas which can be used to regenerate adsorbers in the front end cleanup system (not shown).

Liquid oxygen (LOX) is withdrawn from the bottom of low pressure column 17 via line 41, a portion of this liquid is withdrawn via line 43 and passed as LOX product to a storage tank (not shown). The remaining portion is withdrawn through line 47, warmed and vaporized in main heat exchanger 3, and withdrawn via line 49 as a final oxygen vapor product.

The process plant for the process described above is designed as described below. First, the repeatable engineered components of Table 6 are defined for this example as follows:

1) Distillation Column

Referring to Table 8, the column components are selected for plant capacity code GO and product line code 4. These components are designated using the selected height and diameter codes as follows: high pressure column—lower section, C9, and upper section, B9; low pressure column—lower section, D10, middle section, C10, and upper section, B10.

Structured packing is selected as the mass transfer device. The packing height and diameter of each section are determined from engineering design correlations and are shown in Table 18 below.

TABLE 18

Column Section Height and Diameter for Example (mm)

| Column Section Code | Column/Location | Section Height | Section Diameter |
|---|---|---|---|
| C9 | HP/lower | 3500 | 1150 |
| B9 | HP/upper | 2680 | 1150 |
| D10 | LP/lower | 5770 | 1300 |
| C10 | LP/middle | 3500 | 1100 |
| B10 | LP/upper | 2680 | 1300 |

2. Cold Box

The cold box dimensions are determined from Tables 9 and 10 as follows:
Width=3300 mm
Depth, bottom section=3900 mm
Depth, top section=2400 mm
Height=35000 mm 3. Reboiler The reboiler design is determined from Table 11, which indicates the use of width code W7, height code H7, header code O, and length L (common to all reboilers).

4. Main Heat Exchanger

The main heat exchanger design is determined from Table 12 for plant capacity code GO and product line code 4, which indicates the use of width code WG, height code HG, header code H2, and length L (common to all main heat exchangers).

5. Main Air Compressor

The main air compressor is determined from Table 13 for plant capacity code GO, which indicates the use of compressor frame size/driver code CFD5, which has a maximum air flow rate of 26450 Nm$^3$/hr at 5 barg.

6. Air Booster Compressor

The air booster compressor is determined from Table 14, which indicates the use of a roots blower having a maximum air flow rate of 7209 Nm$^3$/hr at 6.1 barg.

7. Adsorber Vessel

A TSA system is chosen for this design. From Table 15, the adsorber vessel is specified with a diameter of 3300 mm and a tangent-to-tangent dimension of 3300 mm.

8. Expander

The expander is determined from Table 16 as requiring oil-braked expander E2 or optionally expander wheel EW1 in the main air compressor. The expander wheel option is selected for this Example.

9. Process Module Skid

The process module is selected from Table 17 having the module size characterized by a 12 inch diameter air feed inlet line.

Product line and process design document file location 7 and repeatable engineered components document file location 13 (FIG. 1) are reviewed and it is found that some of the detailed design information required for the plant designated by plant capacity code GO and product line code 4 of this example is available from previously-completed detailed designs for plants in other product lines. The engineered component design information available for reuse is summarized in Table 19 below.

TABLE 19

Reusable Detailed Design Information for Plant GO/4 in the Present Example

| | Reused From | | |
|---|---|---|---|
| Component | Plant Cap. Code | Product Line Code | Reference |
| High Pressure Column Lower/Upper Sections | GO | 2 | Table 8 |
| Cold Box Horizontal Cross Section | GO | 3 | Table 9 |
| Reboiler Header | EO | 4 | Table 11 |
| Main Heat Exchanger | GO | 2 | Table 12 |
| Main Air Compressor | LN | 6 | Table 13 |
| Air Booster Compressor | GO | 2 | Table 14 |
| Adsorber Vessel | LN | 6 | Table 15 |
| Expander | EO | 4 | Table 16 |
| Process Module Skid | EO | 4 | Table 17 |

This example illustrates the reuse of detailed designs across product lines and also within a product line. As seen in Table 19, detailed design information used in the subject plant defined by capacity/product line code GO/4 is obtained from plants in different product lines, namely, plants defined by plant capacity/product line codes GO/2, GO/3, and LN/6, and from a plant within the same product line, namely, plant EO/4.

The remaining engineered components in this example have not been previously designed, and thus detailed design is required. These components include the low pressure column lower, middle and upper sections, the cold box elevation, and the reboiler core (width, height, and length). Detailed design is carried out for these components, and the design information is stored electronically in repeatable engineered components document file location 13 of FIGS. 1 and 2 for reuse in further designs.

Finally, detailed designs are carried out for the nonrepeatable engineered components defined earlier. When all detailed design information for all necessary engineered components is available, the final detailed process design for the selected process plant is carried out. Final detailed process plant design documents are stored electronically in a project document file location (not shown) within data file 217 of FIG. 2.

Thus the example embodiment of the present invention described above includes a method and strategy to provide multiple cryogenic air separation product lines from a common set of engineered components. Repeatable engineered components can be used across different product lines as well as within a given product line. The example embodiment provides a framework for the development, design, manufacture, supply, and product management of air separation plants at costs not previously attainable with such low-volume, high-variability, high-cost products. This satisfies buyers' requirements while minimizing engineering design costs by maximizing the use of repeatable engineered components in each plant design.

While the present invention is illustrated above for cryogenic air separation process plants, the generic principles of the invention can be utilized in the engineering design of process plants in other product lines and process plants in the industrial gas field. Such other applications may include hydrogen production, oxygen production by vacuum swing adsorption, and gas separation by pressure swing adsorption. In addition to applications in the industrial gas field, the generic principles of the present invention can be utilized in the engineering design of process plant product lines in other process industries such as, for example, petroleum refining, chemicals, pharmaceuticals, food processing, and primary metals.

What is claimed is:

1. A computer-implemented method for process plant design which comprises:
    (a) defining a plurality of process plant product lines;
    (b) preparing a general process design for each process plant product line;
    (c) dividing each of the general process designs of (b) into a plurality of engineered components;
    (d) determining from the plurality of engineered components of (c) a minimum number of repeatable engineered components and the process attributes thereof which are required for future general process designs;
    (e) preparing a detailed design of a process plant in a process plant product line, wherein the detailed design includes
        (e1) selecting specific repeatable engineered components and the process attributes thereof from the minimum number of repeatable engineered components determined in (d) and
        (e2) preparing a detailed design for one or more of the repeatable engineered components selected in (e1); and
    (f) preparing a detailed design of a process plant in another process plant product line, wherein
        (f1) the detailed design includes selecting specific engineered components and the process attributes thereof from the minimum number of repeatable engineered components determined in (d);
        (f2) at least one of the repeatable engineered components selected in (f1) is identical to one of the repeatable engineered components of (e2) for which a detailed design has been prepared; and
        (f3) the detailed design of the repeatable engineered component of (e2) is reused in the detailed design of the process plant of (f).

2. The computer-implemented method of claim 1 which further comprises, as part of (d), modifying the general process designs for one or more of the process plants to optimize the combination of general process designs and the minimum number of repeatable engineered components and the process attributes thereof.

3. The computer-implemented method of claim 1 which further comprises preparing additional detailed designs of process plants in the process plant product lines wherein each additional detailed process plant design utilizes at least one previous detailed design of a repeatable engineered component.

4. The computer-implemented method of claim 3 wherein a detailed design is prepared for at least one additional repeatable engineered component.

5. The computer-implemented method of claim 4 which further comprises storing design information in electronic format from previous detailed designs of repeatable engineered components in a computer-based document and data management system for future use in additional detailed designs of process plants in the process plant product lines.

6. The computer-implemented method of claim 1 wherein the future general process design of each process plant allows acceptable projections of plant capital cost and operating efficiency.

7. The computer-implemented method of claim 1 wherein the process plant product lines comprise cryogenic air separation plants.

8. The computer-implemented method of claim 1 wherein the process plant product lines comprise hydrogen production plants.

9. The computer-implemented method of claim 1 wherein the process plant product lines comprise gas separation pressure swing adsorption plants.

10. The computer-implemented method of claim 9 wherein the pressure swing adsorption plants are designed for the separation of air.

11. The computer-implemented method of claim 7 wherein the repeatable engineered components comprise engineered components selected from the group consisting of feed air cleanup systems, main heat exchangers, reboilers, distillation column sections, cold enclosures, main air compression systems, air booster compressors, gas expanders, recycle compressors, process control systems, warm piping, cold piping, cryogenic liquid pumps, and product gas compressors.

12. The computer-implemented method of claim 11 wherein each distillation column section is defined by the column diameter and the height of vapor-liquid mass transfer devices.

13. The computer-implemented method of claim 11 wherein each main air compression system is defined by maximum air flow rate and discharge pressure.

14. The computer-implemented method of claim 11 wherein each gas expander is defined gas flow rate and pressure ratio.

15. The computer-implemented method of claim 7 wherein the process plant product line includes plants which produce one or more products selected from the group consisting of oxygen gas containing 95–99 vol % oxygen, oxygen gas containing up to 99.8 vol % oxygen, liquid oxygen, nitrogen gas containing between about 0.1 to 1 parts per million by volume non-nitrogen components, nitrogen gas containing up to about 0.5 parts per billion by volume non-nitrogen components, and liquid nitrogen.

16. A computer-implemented method for process plant design which comprises:
   (a) defining a plurality of process plant product lines;
   (b) defining a minimum number of repeatable engineered components and the process attributes thereof such that specific repeatable engineered components can be selected therefrom and combined in a general process design of each process plant product line;
   (c) preparing a detailed design of a process plant in a process plant product line which includes selecting specific repeatable engineered components from the minimum number of repeatable engineered components defined in (b), wherein the detailed design of the process plant includes preparing a detailed design of at least one of the selected repeatable engineered components; and
   (d) preparing detailed designs of one or more additional process plants in different process plant product lines which includes selecting specific repeatable engineered components from the minimum number of repeatable engineered components defined in (b), wherein at least one of the specific repeatable engineered components selected in (d) is identical to the selected repeatable engineered subsystem of (c) for which the detailed design was prepared, and preparing additional detailed designs of repeatable engineered subsystems required for the detailed designs of additional process plants in (d), wherein at least one of the process plant product lines in (d) is different than the process plant product line in (c); and
   (e) storing design information from the detailed designs of repeatable engineered components in (c) and (d) in a design database for future use in additional detailed designs of process plants in the process plant product lines.

17. The computer-implemented method of claim 16 wherein the future general process design of each process plant allows acceptable projections of plant capital cost and operating efficiency.

18. The computer-implemented method of claim 16 which further comprises preparing a general process design of a process plant suitable for a cost proposal, wherein the general process design comprises:
   (1) determining the process plant requirements of a potential buyer;
   (2) choosing from the process plant product line a selected process plant which satisfies the requirements of the potential buyer; and
   (3) preparing a general process design of the selected process plant which includes utilizing repeatable engineered components selected from the minimum number of repeatable engineered components defined in (b).

19. The computer-implemented method of claim 18 which further comprises utilizing the general process design of the selected process plant to prepare a cost proposal for the potential buyer.

20. The computer-implemented method of claim 19 which further comprises preparing a detailed design of the selected process plant which includes utilizing the design information of (e) for the repeatable engineered components selected in (3).

21. A computer-implemented method for process plant design which comprises:
   (a) defining a plurality of process plant product lines, generating a first set of electronic documents containing the definitions of the process plant product lines, and storing the first set of electronic documents in a computer-based document and data management system;
   (b) preparing a general process design for each process plant product line, generating a second set of electronic documents containing process design information for each process plant, and storing the second set of electronic documents in the computer-based document and data management system;
   (c) dividing each of the general process designs of (b) into a plurality of engineered components;
   (d) determining from the plurality of engineered components of (c) a minimum number of repeatable engineered components and the process attributes thereof which are required for future general process designs, generating a third set of electronic documents which contain information defining the minimum number of repeatable engineered components and the process attributes thereof, and storing the third set of electronic documents in the computer-based document and data management system;
   (e) preparing a detailed design of a process plant in a process plant product line, wherein the detailed design includes
      (e1) selecting specific repeatable engineered components and the process attributes thereof from the minimum number of repeatable engineered components determined in (d) and retrieving information in electronic form on the specific repeatable engineered components and the process attributes thereof from the third set of electronic documents in the computer-based document and data management system;
      (e2) preparing a detailed design for one or more of the repeatable engineered components selected in (e1), generating a fourth set of electronic documents containing detailed design information; and storing the fourth set of electronic documents in the computer-based document and data management system;
   (f) preparing a detailed design of a process plant in another process plant product line, wherein
      (f1) the detailed design includes selecting specific engineered components and the process attributes thereof from the minimum number of repeatable engineered components determined in (d) and this selected information is retrieved in electronic form from the third set of electronic documents in the computer-based document and data management system;
      (f2) at least one of the repeatable engineered components selected in (f1) is identical to one of the repeatable engineered components of (e2) for which a detailed design has been prepared and stored electronically in the computer-based document and data management system; and
      (f3) the detailed design of the one repeatable engineered component of (e2) is retrieved in electronic form from the fourth set of electronic documents and is reused in the detailed design of the process plant of (f).

22. A computer-implemented method for cryogenic air separation plant design which comprises:
- (a) defining a plurality of cryogenic air separation process plant product lines;
- (b) preparing a general process design for each cryogenic air separation process plant product line;
- (c) dividing each of the general process designs of (b) into a plurality of engineered components;
- (d) determining from the plurality of engineered components of (c) a minimum number of repeatable engineered components and the process attributes thereof which are required for future general cryogenic air separation process plant designs;
- (e) preparing a detailed design of a process plant in a cryogenic air separation process plant product line, wherein the detailed design includes
  - (e1) selecting specific repeatable engineered components and the process attributes thereof from the minimum number of repeatable engineered components determined in (d) and
  - (e2) preparing a detailed design for one or more of the repeatable engineered components selected in (e1); and
- (f) preparing a detailed design of a process plant in another cryogenic air separation process plant product line, wherein
  - (f1) the detailed design includes selecting specific engineered components and the process attributes thereof from the minimum number of repeatable engineered components determined in (d);
  - (f2) at least one of the repeatable engineered components selected in (f1) is identical to one of the repeatable engineered components of (e2) for which a detailed design has been prepared; and
  - (f3) the detailed design of the repeatable engineered component of (e2) is reused in the detailed design of the process plant of (f).

23. The computer-implemented method of claim 22 wherein the repeatable engineered components comprise engineered components selected from the group consisting of feed air cleanup systems, main heat exchangers, reboilers, distillation column sections, cold enclosures, main air compression systems, air booster compressors, gas expanders, recycle compressors, process control systems, warm piping, cold piping, cryogenic liquid pumps, and product gas compressors.

24. The computer-implemented method of claim 23 wherein each distillation column section is defined by the column diameter and the height of vapor-liquid mass transfer devices.

25. The computer-implemented method of claim 23 wherein each main air compression system is defined by maximum air flow rate and discharge pressure.

26. The computer-implemented method of claim 23 wherein each gas expander is defined gas flow rate and pressure ratio.

27. The computer-implemented method of claim 22 wherein the process plant product line includes plants which produce one or more products selected from the group consisting of oxygen gas containing 95–99 vol % oxygen, oxygen gas containing up to 99.8 vol % oxygen, liquid oxygen, nitrogen gas containing between about 0.1 to 1 parts per million by volume non-nitrogen components, nitrogen gas containing up to about 0.5 parts per billion by volume non-nitrogen components, and liquid nitrogen.

* * * * *